(12) United States Patent
Busse et al.

(10) Patent No.: US 7,230,221 B2
(45) Date of Patent: Jun. 12, 2007

(54) PORTABLE AIR DEFENSE GROUND BASED LAUNCH DETECTION SYSTEM

(75) Inventors: Richard J. Busse, Camarillo, CA (US); Raymond J. Blattel, Oxnard, CA (US); Mallory J. Boyd, Ridgecrest, CA (US); Michael D. Barrett, Camarillo, CA (US); William R. Ditzler, Ridgecrest, CA (US); Jason R. Allen, Ridgecrest, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 279 days.

(21) Appl. No.: 11/084,264

(22) Filed: Mar. 2, 2005

(65) Prior Publication Data

US 2006/0284050 A1 Dec. 21, 2006

(51) Int. Cl.
*G01G 21/02* (2006.01)

(52) U.S. Cl. .................. 250/203.6; 382/103; 340/945

(58) Field of Classification Search .................. 342/13, 342/14, 53, 36, 67; 250/203.1, 203.3, 203.6; 382/103; 340/945
See application file for complete search history.

(56) References Cited

U.S. PATENT DOCUMENTS

| | | | | |
|---|---|---|---|---|
| 5,815,590 | A * | 9/1998 | Buttner et al. | 382/103 |
| 6,738,012 | B1 * | 5/2004 | Kirkpatrick | 342/67 |
| 6,977,598 | B2 * | 12/2005 | Longbottom | 340/945 |
| 6,980,152 | B2 * | 12/2005 | Steadman et al. | 342/14 |

* cited by examiner

*Primary Examiner*—Mark Hellner
(74) *Attorney, Agent, or Firm*—David S. Kalmbaugh

(57) ABSTRACT

A ground based launch detection system consisting of a sensor grid of electro-optical sensors for detecting the launch of a threat missile which targets commercial aircraft in proximity to a commercial airport or airfield. The electro-optical sensors are configured in a wireless network which broadcast threat lines to neighboring sensors with overlapping field of views. When a threat missile is verified, threat data is sent to a centrally located processing facility which determines which aircraft in the vicinity are targets and send a dispense countermeasure signal to the aircraft.

20 Claims, 16 Drawing Sheets

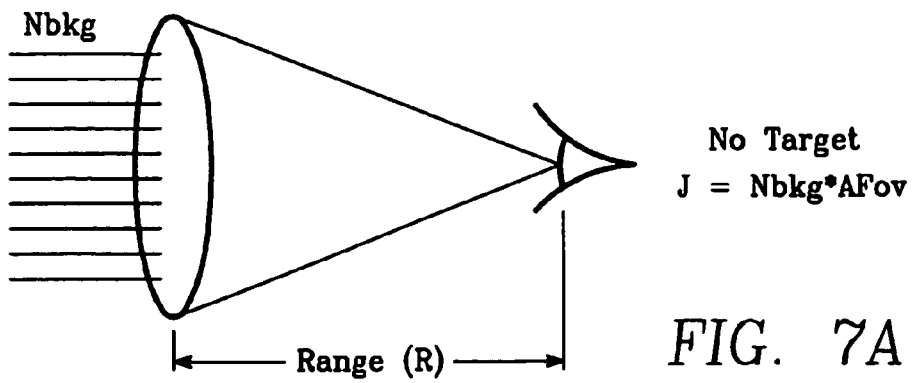

No Target
$J = Nbkg \cdot AFov$

FIG. 7A

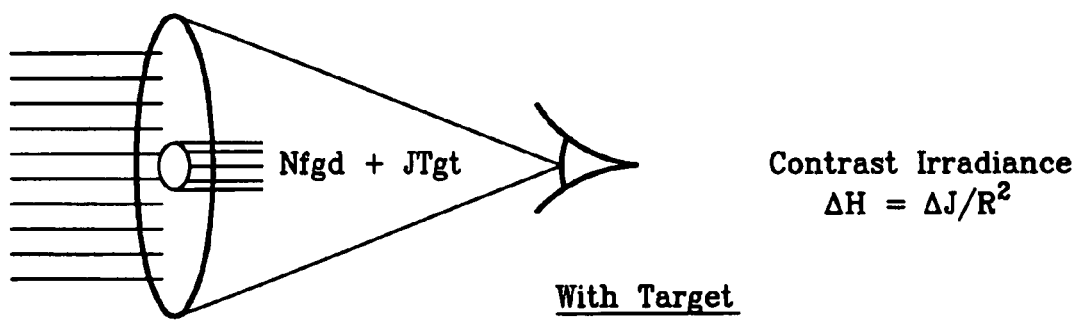

Contrast Irradiance
$\Delta H = \Delta J/R^2$

<u>With Target</u>

$J = JTgt \cdot Tau + Nbkg \cdot AFov - Nbkg \cdot AreaTgt + Nfgd \cdot AreaTgt$
$\Delta J = (J \text{ With Target} - J \text{ No Target})$
$\Delta J = JTgt \cdot Tau + Nfgd \cdot AreaTgt - Nbkg \cdot AreaTgt$

H = Contrast Irradiance
J = Radiant Intensity
N = Radiance
Nbkg = Background Radiance
Nfgd = Foreground Radiance
R = Range
Tau = Atmosphere Transmission

PORTABLE AIR DEFENSE GROUND BASED LAUNCH DETECTION SYSTEM

BACKGROUND OF THE INVENTION

1. Field of the Invention

The present invention relates generally to aircraft takeoff and landing systems. More particularly, the present invention relates to a ground based detection system which senses the firing of a shoulder launched missile or similar weapons system at an aircraft during takeoff and landing.

2. Description of the Prior Art

The recent FBI warnings concerning threats to civil aircraft from shoulder launched infrared missiles has caused concern among government agencies about the consequences of such an attack. The consequences of this type of attack on civilian aircraft would include a significant loss of life, that is several hundred innocent victims in the air and on the ground; a total disruption of air traffic; and a significant setback to the U.S. economy and the economy of our allies. If such attack were to occur and be successful it could have the same impact as the attack on the twin towers in New York city on Sep. 11, 2001.

The desirable characteristics of a countermeasures system to prevent a shoulder fired missile attack on an aircraft would include cost containment, rapid deployment in the field once the system is proven reliable and an ability to integrate the countermeasures system with the 5000 plus commercial aircraft flying within the United States and overseas.

The difficulty in integrating countermeasures systems developed for the military is that these systems are expensive and often require specialized training of the aircraft pilots to effectively use the systems to prevent a successful attack on a commercial aircraft. In addition, military type missile warning system would require extensive airframe modifications to position sensors remotely on the aircraft and integrate the countermeasures dispensers which normally flares. Infrared jamming systems are even more costly and even more costly to integrate into a commercial aircraft.

Accordingly, there is a need for a cost effective, highly reliable anti-missile system to protect commercial aircraft which makes use of available sensor technology and which is relatively easy to deploy at large airports as well as smaller rural airfields.

SUMMARY OF THE INVENTION

The present invention overcomes some of the disadvantages of the past including those mentioned above in that it comprises a relatively simple yet highly effective and cost efficient air defense ground-based launch detection system which prevents commercial aircraft from being attacked by a shoulder launched missile or similar weapons system.

The present invention comprises a detection system for sensing the launch of a shoulder fired missile. The detection system includes two columns of sensors/cameras with one column of the two columns of sensors being positioned on each side of an airport flight path, facing towards the center of the flight path. Sensor detection sectors of the airport flight path are overlapping which results in very reliable launch detection since there must an agreement between at least two optical sensors that a launch has occurred. Sensors operating in the infrared are used in the present invention for launch detection.

Each sensor broadcast all potential threat data to its neighbor sensors. Once a threat missile is verified, threat data is sent to a centrally located processing facility which includes a data processing computer. The centrally located processing facility will then determine which aircraft in the vicinity are potential targets and send a dispense countermeasure signal to the threatened aircraft. Each sensor includes an electro-optical sensor, a data processing computer and monitor and an antenna for communicating with the central node via a wireless link. The centrally located processing facility includes an antenna for communicating with each of the sensor nodes, the data processing computer and a monitor and an antenna for communicating with the aircraft 224 via an RF link. The aircraft upon receiving the dispense countermeasure signal dispenses a countermeasure which may be a flare, chaff or other countermeasure which re-routes a missile from its target.

BRIEF DESCRIPTION OF THE DRAWINGS

FIG. 7 illustrates the process and equations used to calculate threat contrast irradiance for various sensor types to be used in the preferred embodiment of the present invention;

DETAILED DESCRIPTION OF THE PREFERRED EMBODIMENTS

Figure 1:
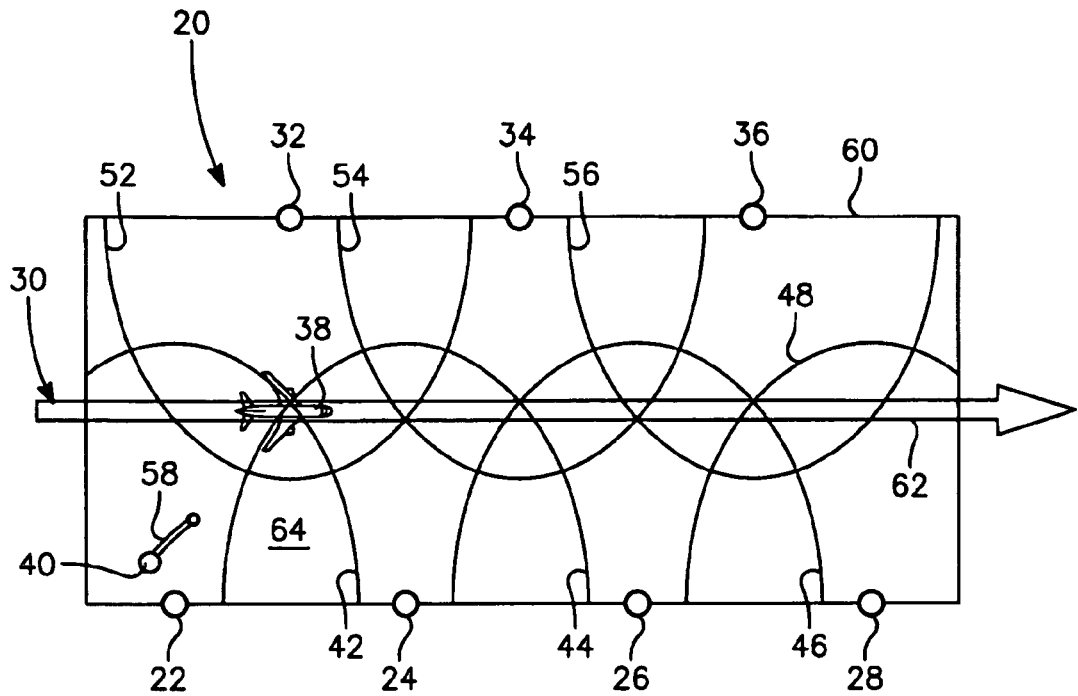
FIGS. 1-6 illustrate a grid system of electro-optical sensors which is used detect the launching of a shoulder fired missile at an aircraft during takeoff or landing of the aircraft comprising a preferred embodiment of the present invention.

Referring to FIGS. 1-6, there is shown an optical sensor system or grid 20 comprising four optical sensors 22, 24, 26 and 28 positioned on the right side of an aircraft flight path 30 and three optical sensors 32, 34 and 36 positioned on the left side of aircraft flight path 30 in the direction of flight of aircraft 38. Each optical sensor 22, 24, 26, 28, 32, 34 and 36 has a coverage area, that is an area in which the individual sensor can monitor the flight path 30 and airspace surrounding the flight path 30 to determine if there is a threat 40 against aircraft 38. The threat 30 may be any shoulder launched missile which is used in war to destroy enemy aircraft.

For optical sensor 22 the field of view, which is generally circular in shape, is designated by the reference numeral 42. On the right side of flight path 30, optical sensor 24 has a field of view 44; optical sensor 26 has an field of view 46; and optical sensor 28 has an field of view 48. On the left side of flight path 30, optical sensor 32 has a field of view 52; optical sensor 34 has a field of view 54; and optical sensor 36 has an field of view 56. The flight path of the threat missile 40 is designated by the reference numeral 58.

Referring to FIG. 1, FIG. 1 depicts the aircraft departure/flight path 30 which is continuously surveyed by optical sensors 22, 24, 26, 28, 32, 34 and 36, which provide a corridor of coverage 60 coincident with aircraft flight path 30 for the runway 62. The width of the corridor 60 is selected to provide sensor coverage for any possible threat missile launch scenario.

At this time it should be noted that there are overlaps in the sensor fields of views (FOVs) to enhance false-alarm rejection performance of the grid system 20. For example, field of view 42, overlaps with field of view 44 in an area of multiple sensor coverage 64.

Figure 2:
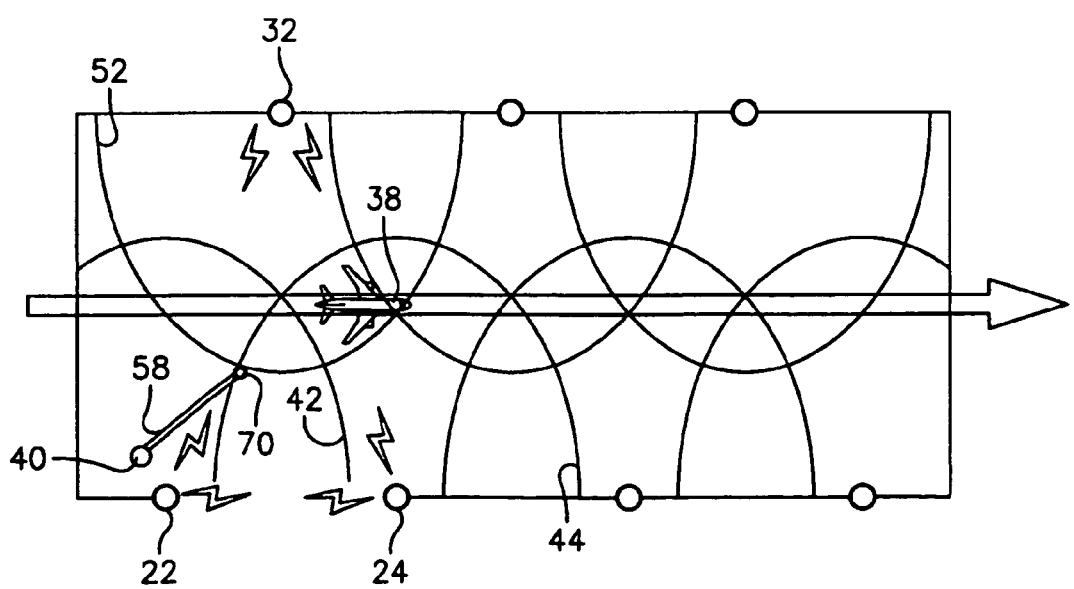
Figure 3:
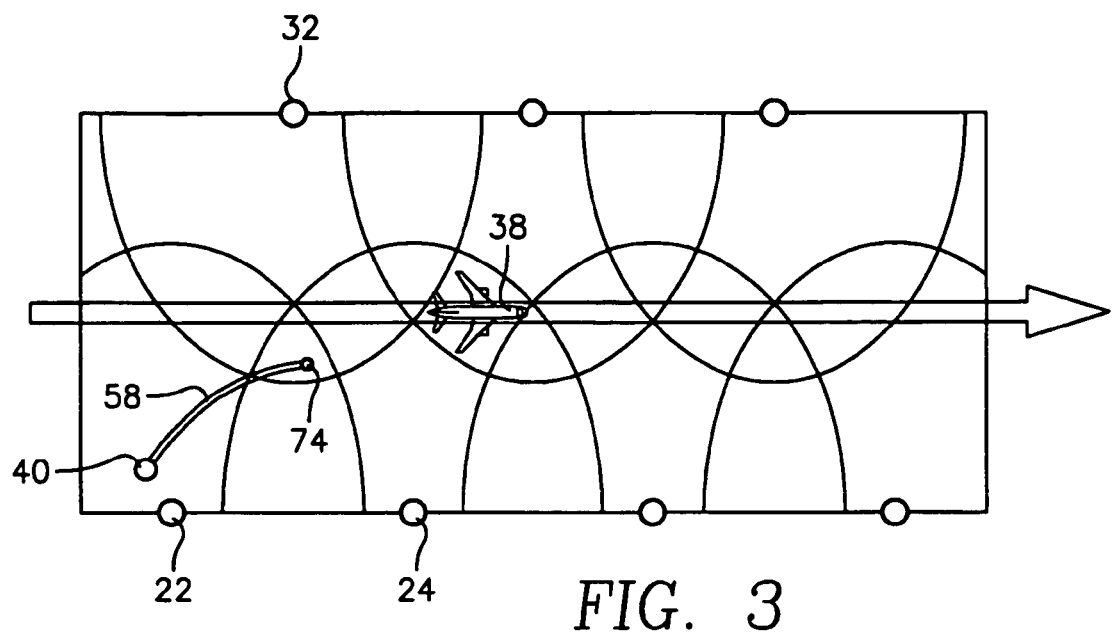

Referring now to FIGS. 2 and 3, in FIGS. 2 and 3, the launch of threat missile 40 is observable by multiple sensors 22, 24 and 32 at an intersection point 70 along flight path 58. Optical sensors 22, 24 and 32, in turn, share their observations with each other. The field of views 42, 44 and 52 respectively for sensors 22, 24 and 32 first intersect at point 70 along flight path 58 in FIG. 3.

The observations/detection of threat missile 40 by optical sensors 22, 24 and 32 is represented as a line-of-bearing, that is a relatable angle/angle position of the event. To be useful to other sensors within grid system 20, each sensor needs to report angle/angle data in an absolute form such that neighboring sensors know where the threat missile 40 is being observed. By using multiple optical sensors 22, 24, 26, 28, 32, 34 and 36 to observe a threat missile before an alert is generated there is a significant decrease in false alarms significantly. Further a 3-dimensional description of the missile launch is obtained through triangulation of two or more optical sensors 22, 24, 26, 28, 32, 34 and 36.

Figure 4:
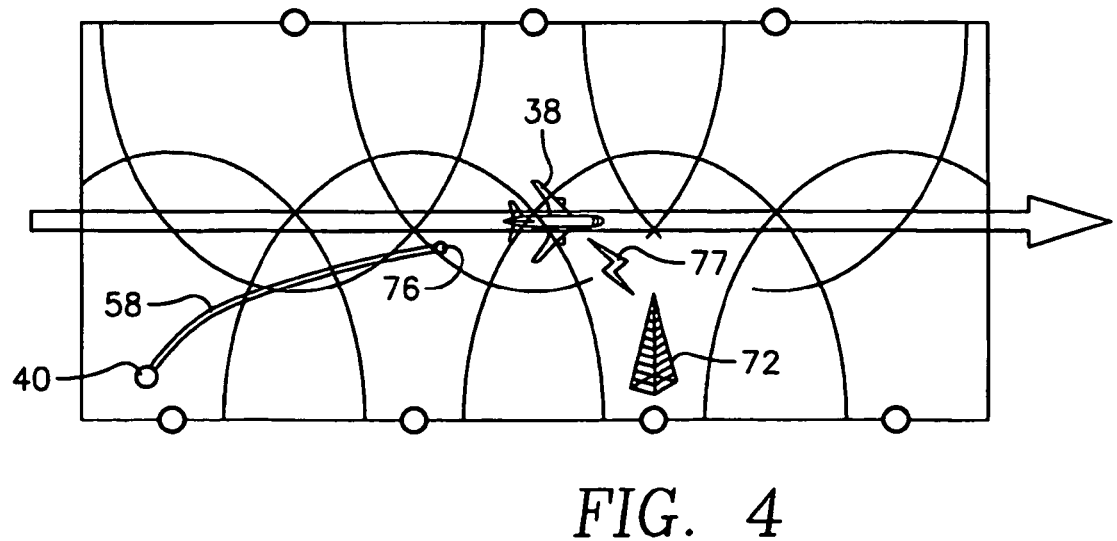

Referring to FIGS. 3 and 4, when the threat missile has traveled to position 74, illustrated in FIG. 3, neighboring sensors 22, 24 and 32 corroborate or verify that a threat missile launch has occurred and the missile is traveling along flight path 58 on an intercept course with aircraft 38. When the threat missile has traveled to position 76, illustrated in FIG. 4, an alert signal 77 is relayed by optical sensor gird 20 to a centralized automated controller comprising an omni-directional broadcast tower 72. Location information for the threat missile 40 as it travels along flight path 58 is available to the sensor grid 20 allowing for the determination of which aircraft to alert, when multiple aircraft are present along flight path 30. Location information is continuously received by the central tower 72 and, along with the knowledge of which optical sensors 22, 24, 26, 28, 32, 34 and 36 are observing the flight, enables proper aircraft notification.

Figure 5:
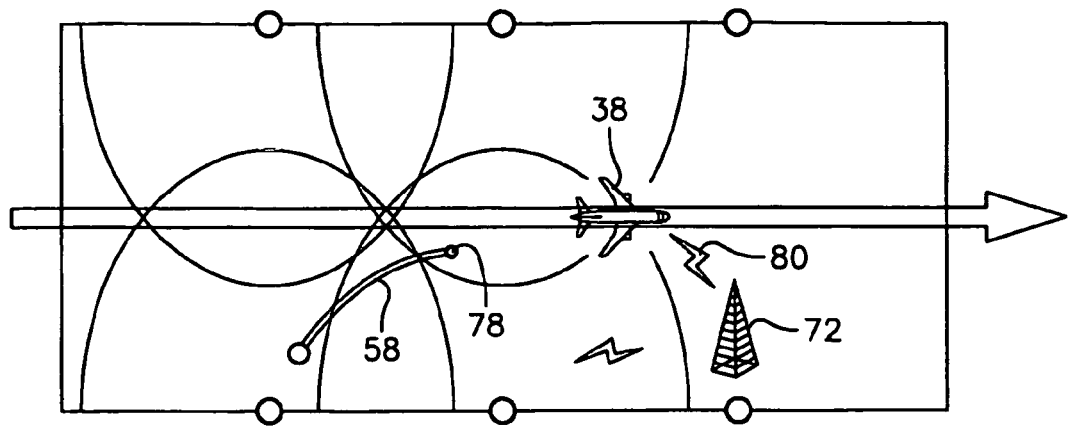
Figure 6:
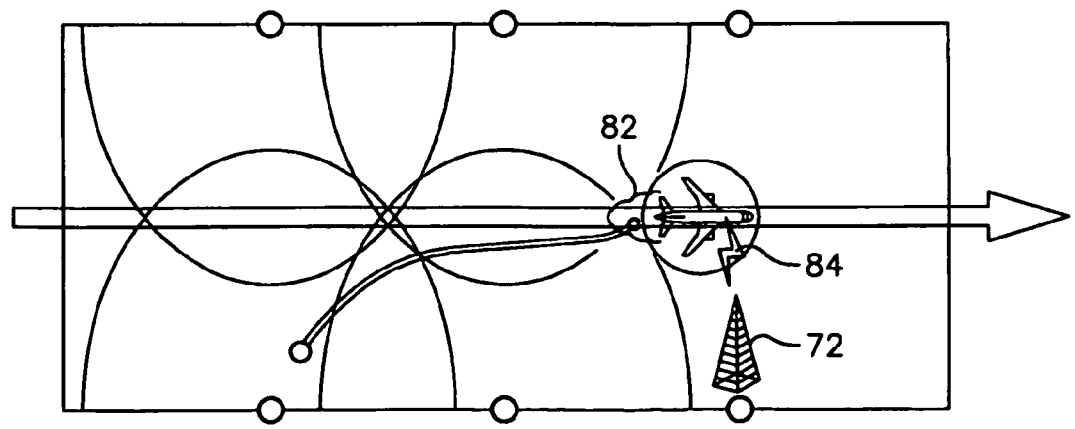
Figure 8:
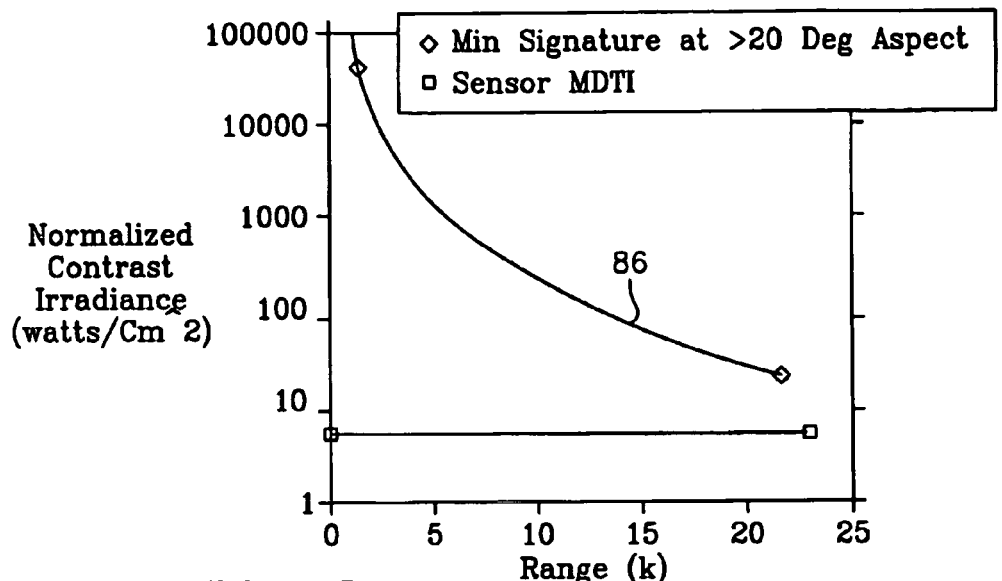
FIG. 8 is a graph which depicts medium-wave IR band performance of optical sensors in a mid-latitude summer visibility condition for 23-km visibility.
Figure 9:
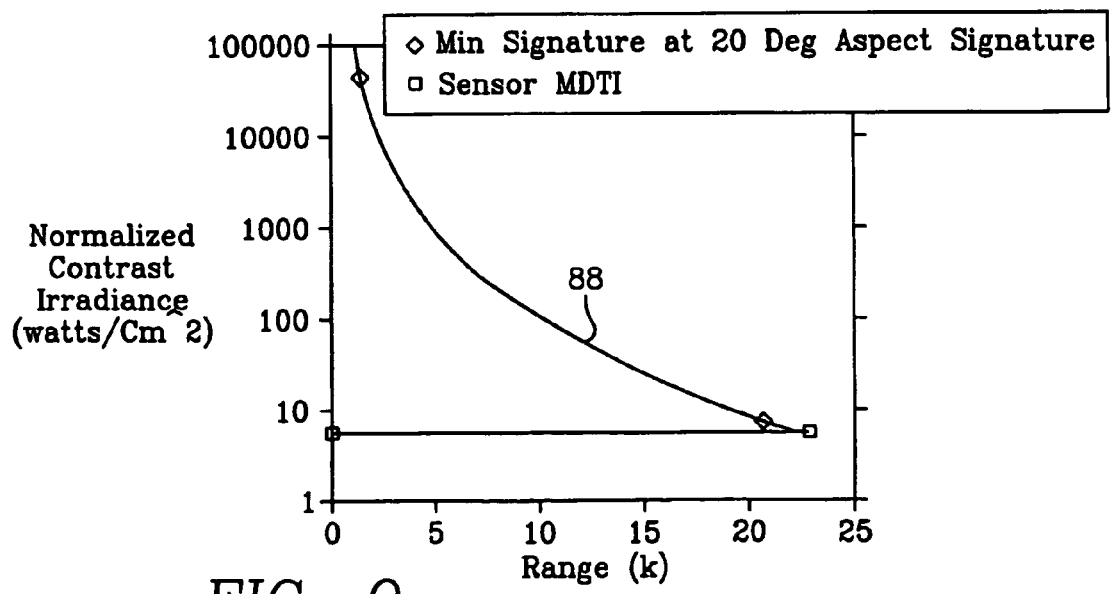
FIG. 9 is a graph which depicts medium-wave IR band performance of optical sensors in a mid-latitude summer visibility condition for 5-km visibility.

Referring to FIGS. 5 and 6, when the threat missile is at location 78 along flight path 58, a command signal 80 is relayed by tower 72 to target aircraft 38 to dispense countermeasures which, in turn, dispenses a countermeasure 82 as depicted in FIG. 6. The target aircraft 38 can then relay a message 84 to tower 72 that the attack has been thwarted and The sensor grid 20 provides the required threat alert and automated cue of the threat missile approaching the aircraft. This is followed by the deployment of the aircraft countermeasure 82.

The distributed-sensor-grid concept 20 entailed the deployment of a network of sensors 22, 24, 26, 28, 32, 34 and 36 illustrated in FIGS. 1-6 which are capable of detecting missile launches. The sensor grid 20 is capable of launch detection and alert within the limited time available to initiate a successful countermeasure deployment. The grid size and density vary for each airport, depending on such factors as proximity to water, mountains, and structures in the vicinity of the airport. In addition, the required grid size is influenced by the flight patterns of the aircraft. An aircraft is generally vulnerable at altitudes less than 12,000 feet. This, coupled with the missile launch acceptability range (LAR), defines the area on the ground that must be surveyed to detect launches that may be potential threats to aircraft.

For sensor requirements, the detectable characteristics of shoulder launched missiles were analyzed. Sensors, including acoustic, radar, electro-optical (EO), ultraviolet (UV), visible, medium-wave IR (MWIR), near infrared (NIR) and long-wave IR (LWIR), were considered based upon performance, technology maturation, availability, and cost.

With regard to the electro-optical signature, missiles, when fired, emit considerable in-band radiant energy. This radiant energy can be exploited to determine launch-event location, velocity, acceleration, and trajectory. Primary spectral bands that can be exploited are the UV, visible, MWIR, and LWIR. The UV and MWIR bands have been used in the past for detection and tracking of threat surface-to-air missiles (SAMs) for protection of military aircraft, including helicopters and fixed-wing aircraft.

For these reasons, the focus was on sensor technologies tuned to these spectral bands, which would yield the best-performing system. This focus led to an extensive analysis of optical sensor performance characteristics from the UV through LWIR for use in grid 20.

Sensors that exploit the radiant energy common to electro-optical bands are not practical to protect areas over large bodies of water. In this case, a land-based radar is the preferred sensor.

The requirements for the sensors that form the basis of the ground based threat detection and tracking system include (1) missile threat detection and declaration with high probability of success and low false alarm rate, (2) sensor grid coverage adequate to provide surveillance of airport threat areas under normal landing and takeoff conditions, and (3) a provision for wide field of view with resolution sufficient for clutter rejection and target tracking. Typical shoulder launched missiles that are expected to be threats to aircraft are listed in Table I. Effective operational speed, range, and altitude of shoulder launch missile systems are set forth in Table I.

TABLE I

Effective Speed, Range, and Altitude of Missile Devices.

| Missile | Maximum speed, m/s (ft/s) | Maximum effective range, m (ft) | Minimum range, m (ft) | Maximum effective altitude, m (ft) |
|---|---|---|---|---|
| Stinger | 580 (1902.4) | 4800 (15744) | 200 (656) | 3800 (12464) |
| SA-7 | 580 (1902.4) | 4200 (13776) | 800 (2624) | 2300 (7544) |
| SA-14 | 470 (1541.6) | 4500 (14760) | 600 (1968) | 3000 (9840) |
| SA-16 | 570 (1869.6) | 5200 (17056) | 500 (1640) | 3500 (11480) |
| SA-18 | 570 (1869.6) | 5200 (17056) | 500 (1640) | 3500 (11480) |

The design of the electro-optical sensor grid 20 included an reliability and false-alarm requirements analysis. The major effort of the analysis consisted of a determination of: (1) missile threat characteristics in terms of signature and kinematic performance; (2) determination of threat zones around a typical major commercial or military airport; (3) consideration of useful electro-optical sensor devices; (4) analysis of sensor sensitivity, threat missile signature contrast radiation available, and atmospheric effects; and (5) a determination of minimum declaration range with required probability of success and low false alarm rate.

Threat missile electro-optical signatures and sensor technologies were evaluated for their potential to operate in the most exploitable threat signature spectral bands. Electro-optical sensors were evaluated and tested to determine sensitivity, spatial resolution, clutter rejection capability, maturity, and cost. Data relating to missile threat kinematic performance in terms of speed, velocity, range, and altitude was also collected and analyzed. Standard terminal arrival (STAR) and standard instrument departures (SIDs) were reviewed for a typical airport which in this case was Los Angeles International Airport and threat zones were developed based on this information and missile threat performance characteristics.

Although actual threat signatures are classified, the following information is threat missiles is unclassified. Typical threat missiles operate in three propulsion stages. First, an ejector motor ignites and burns for a small fraction of a second to eject the missile 5 to 10 meters away from the launch tube. This is followed by the ignition of the missile's boost motor for 1 to 2 seconds. At the end of the boost phaser, the motor transitions to a sustainer phase, which lasts from 3 to 10 seconds. The optical signatures, especially in the 3 to 5 micrometer (mm) band, are dependent on aspect angle to the missile and also dependent on the ejector motor and boost-phase signatures being at least three to four times that of the motor's sustainer phase.

As previously stated, the ejector motor signature, while significant, will last for only a very short time, i.e. a fraction of a second and thus is not exploitable for track file development. The signature may, however, be useful for an alarm or bell-ringer function. The boost phase is useful for an initial alert and false-alarm mitigation phase of; however, the relatively short time period of 1 to 2 seconds is insufficient to ensure detection and track file generation.

An analysis was made of electro-optical sensors which included a determination of the minimum target declaration range of each sensor for given atmospheric conditions. As shown in FIGS. 7A-7C, this analysis consisted of (1) calculating the threat contrast irradiance $\Delta H$ as a function of range R, using a source in-band radiant intensity J and atmospheric transmission Tau and background radiance Nbkg and foreground radiance Nfgd, and a commercial version of the Air Force Geophysics Laboratory (AFGL) Moderate Resolution Atmospheric Transmission (MODTRAN) Model, (2) determining the noise equivalent irradiance (NEI) of each sensor type, (3) selecting a signal-to-noise factor (SNF) that provides the required probability of detection and FAR, and (4) calculating the minimum detectable target irradiance (MDTI), i.e., MDTI=NEI*SNF. The threat contrast irradiance is the irradiance reaching a notional sensor aperture from a specific missile after being propagated through a typical atmospheric path. This stage occurs at relatively low altitudes, making the observation of this stage more susceptible to LOS (line of sight) obscurations due to natural and man-made objects. In addition, a low-altitude LOS obscuration is indirectly proportional to sensor spacing, favoring low-cost sensors.

Contrast irradiances were developed for mid-latitude summer (MLS) and mid-latitude winter (MLW) and high and low visibility conditions from MWIR, LWIR, and UV threat missile signatures. The contrast irradiances for each signature were plotted along with the MDTI determined for each respective sensor. The threat declaration range is determined by the point of intersection between the target contrast irradiance and the MDTI. Normalized data for the spectral bands analyzed are shown in the plots of FIGS. 8-13.

Referring to FIGS. 8-13, FIGS. 8 and 9 illustrate the performance for the medium-wave IR band in a mid-latitude summer environment for visibility of 23 kilometers and a visibility of 5 kilometers (km), respectively. Available signature from both the particle band (3.5 to 4 mm) and $CO_2$ band (4.5 to 4.7 mm) were combined to develop a total medium-wave IR radiant intensity for the analysis. In an electro-optical sensor, this combination is achieved through the use of a cryogenically cooled filter. A sensor's indium antimonide (InSb) detector is sensitive to both bands. The signature for an aspect of 20 degrees (plot 88, FIG. 9) during the missile's motor sustain phase shows a minimum declaration of better than 21 km under poor-visibility (5 km visibility) conditions. Ranges for aspect angles of greater than 20 degrees are always longer as depicted in plot 86 of FIG. 8. Here, a 20-degree aspect limitation applies as well. Near nose-on ranges are less; however, as can be seen in the sensor grid layout 20 of FIGS. 1-6, this condition last for only a short time during the launch of the missile. With the sensor grid design 20 of FIGS. 1-6, there are always at least two sensors observing the launch of the missile from these favorable geometries. Boost signatures (not shown here) were found to be three to four times those of the sustain phase but lasted only a small fraction (20%) of the total missile launch in time.

Figure 10:
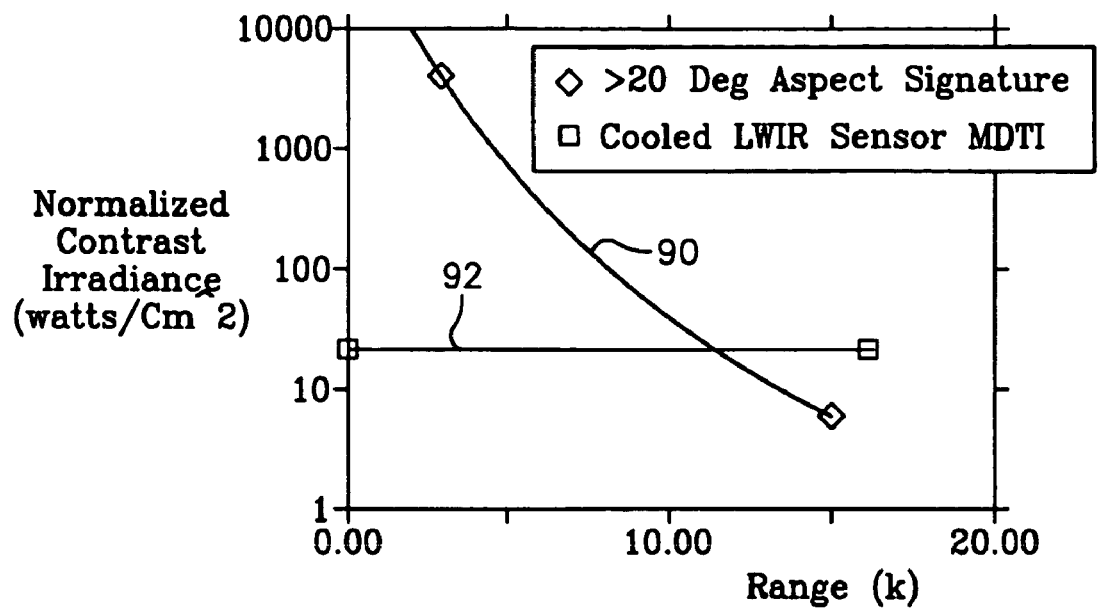
FIG. 10 is a graph which depicts LWIR band performance for a cooled sensor.
Figure 11:
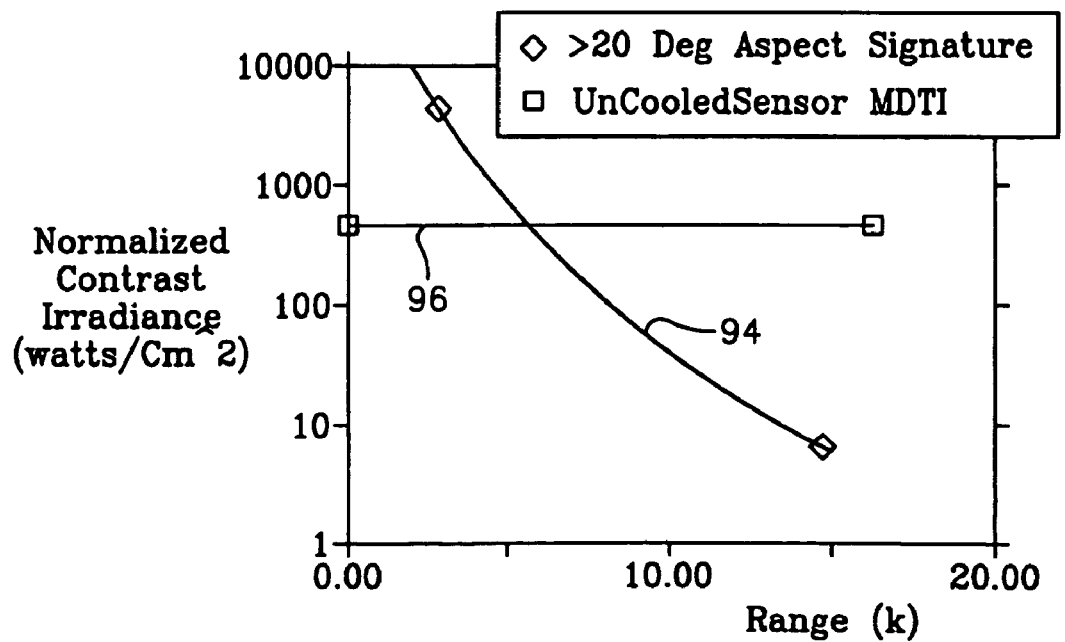
FIG. 11 is a graph which depicts LWIR band performance for an uncooled sensor.

FIGS. 10 and 11 show the performance for the LWIR (long-wave IR) band for a cooled detector sensor and an uncooled detector sensor, respectively. The declaration range (FIG. 10) for the cooled sensor is shown to be about half and for the uncooled sensor (FIG. 11) is shown to be one fourth that of the MWIR. The uncooled detector range performance is about 5.2 km which occurs at the intersection of plots 94 and 96. The cooled detector range performance is about 11.0 km which occurs at the intersection of plots 90 and 92.

Figure 12:
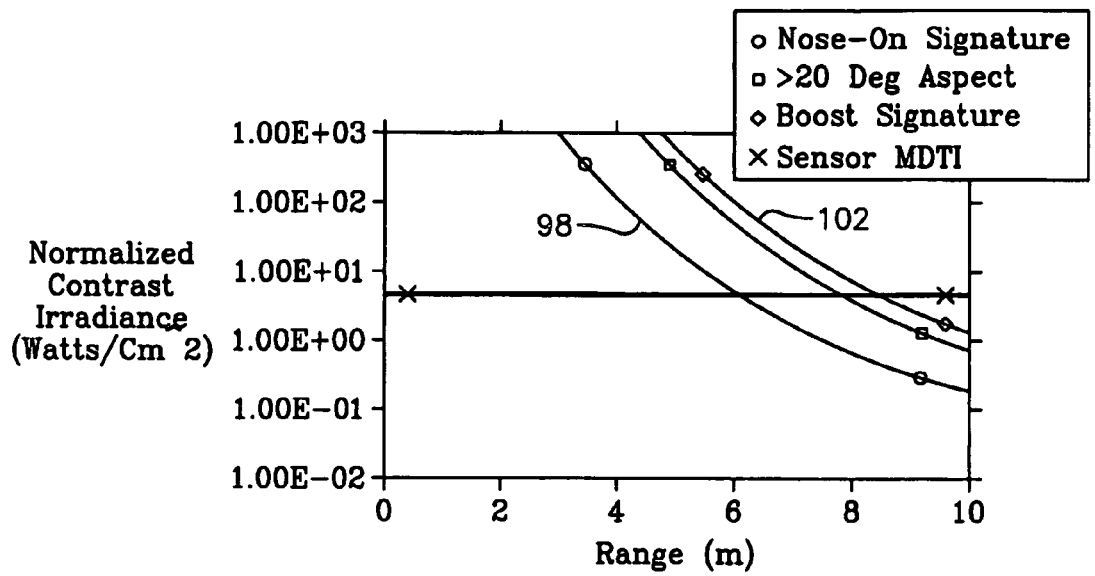
FIG. 12 is a graph which depicts UV band performance of optical sensors in a mid-latitude summer visibility condition for 23-km visibility.
Figure 13:
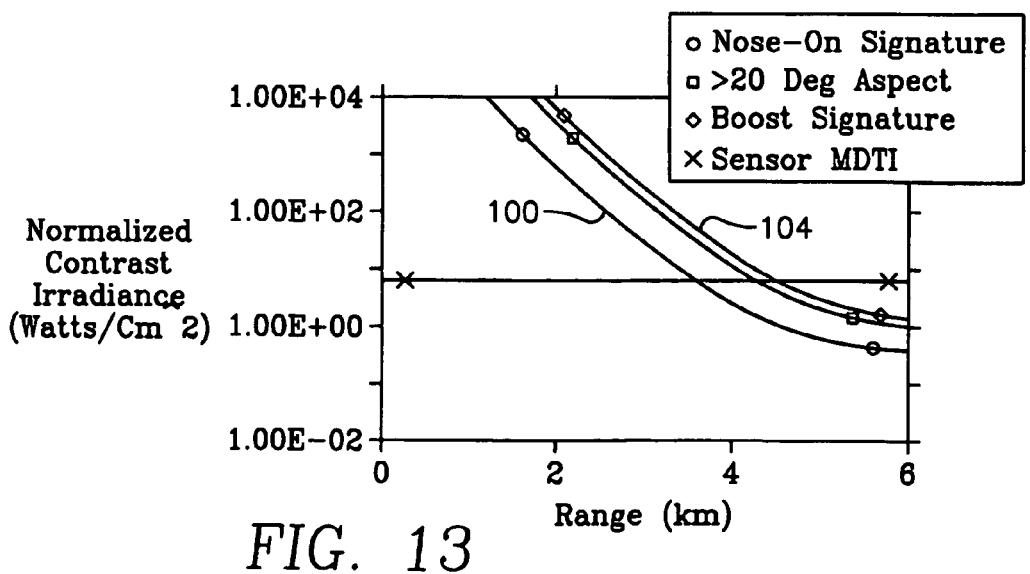
FIG. 13 is a graph which depicts UV band performance of optical sensors in a mid-latitude summer visibility condition for 5-km visibility.

FIGS. 12 and 13 show the performance for the UV band. The declaration range is shown to be about 4.4 kilometers for the poor visibility condition illustrated in FIGS. 13 and 7.8 km for good visibility illustrated in FIG. 12. The nose-on signature/performance (plot 98, FIG. 12, plot 100, FIG. 13) is somewhat less, as expected, and the boost signature (plot 102, FIG. 12, plot 104, FIG. 13) provides only a relatively small increase in range.

The MWIR-band range performance is far superior to that of the other bands considered as depicted in the graphs of FIGS. 8-13. The LWIR band with a cooled detector has the next best performance capability; however, sensors of the type have difficulties in terms of maturity and cost, especially for the high-density array required to provide the relatively large FOV which needs to be provided by sensor grid 20. The uncooled detector for the LWIR band is only a little better than the UV for the poor-visibility condition.

Uncooled detectors not only suffer from low sensitivity but also must be operated with very fast optics; i.e., low F numbers and longer integration times. The problem with the low F number is that it becomes very difficult to achieve adequate optical quality, especially with the wide FOV required by sensor grid 20. The longer integration times can lead to image smearing for fast-moving objects, such as a missile traveling across the focal plane of the sensor. Nevertheless, the uncooled LWIR detector/sensor can still be a consideration if the MWIR sensors are deemed to be to costly and thus unaffordable. The trade off is that considerably more sensors are required to provide the field of view of sensor grid 20, but at a much lower cost per sensor. Additionally, potential object smearing requires image-processing algorithms.

The solar blind UV (ultra-violet) band sensor, although having the advantage of no solar-generated background and thus extremely good sensitivity, suffers significantly from atmospheric transmission losses and does not appear to offer a practical performance capability.

Potential threat areas around a typical large U.S. airport were analyzed to support a preliminary grid layout of the EO sensors. The Federal Aviation Administration (FAA) procedures were reviewed and analyzed to determine the standard terminal approach and departure routes and profiles. Typical approach and departure routes for Los Angeles International Airport (LAX) are shown in the airport arrival and departure routes, designated generally by the reference numeral 105 of FIG. 14. Aircraft climb rates and ground-speed performance data were analyzed to determine ground distance traveled while aircraft are below the threat altitude. The threat altitude is from zero to fourteen thousand feet at an average rate of climb equal 2500 feet per minuter, an average ground speed of 200 knots and a distance traveled below 14,000 feet of 19 nautical miles.

Figure 14:
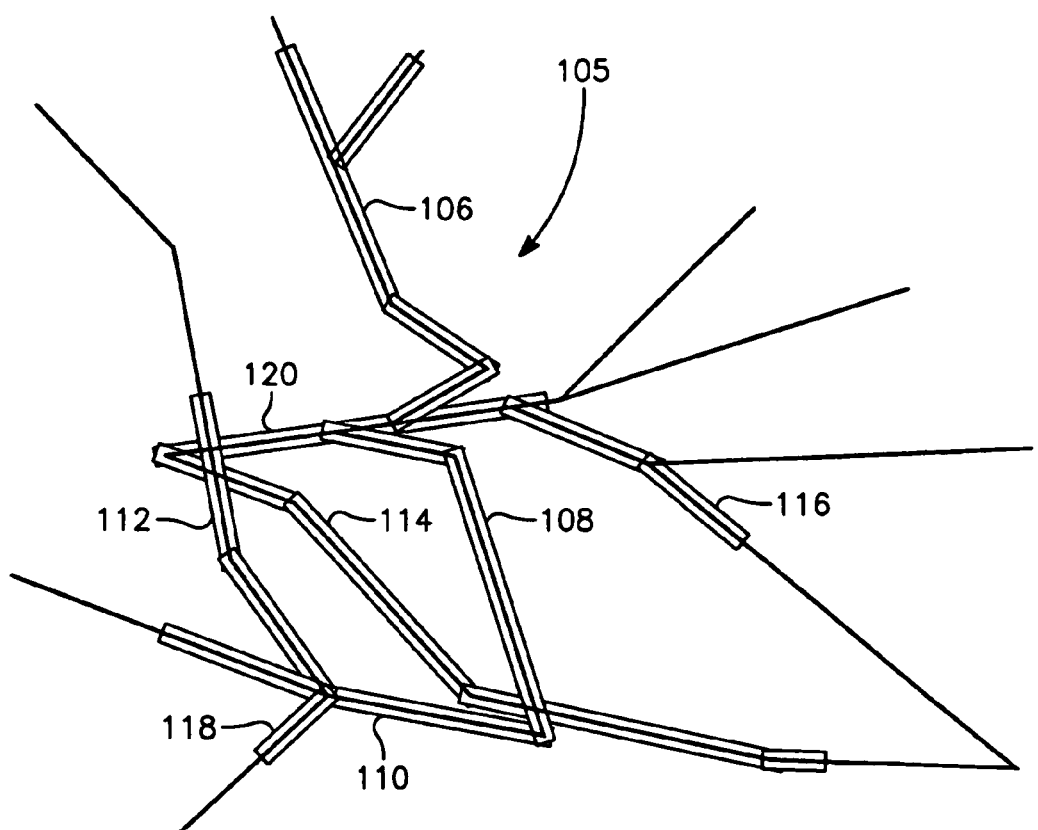
FIG. 14 illustrates arrival routes for Los Angeles International Airport including threat zones.
Figure 15:
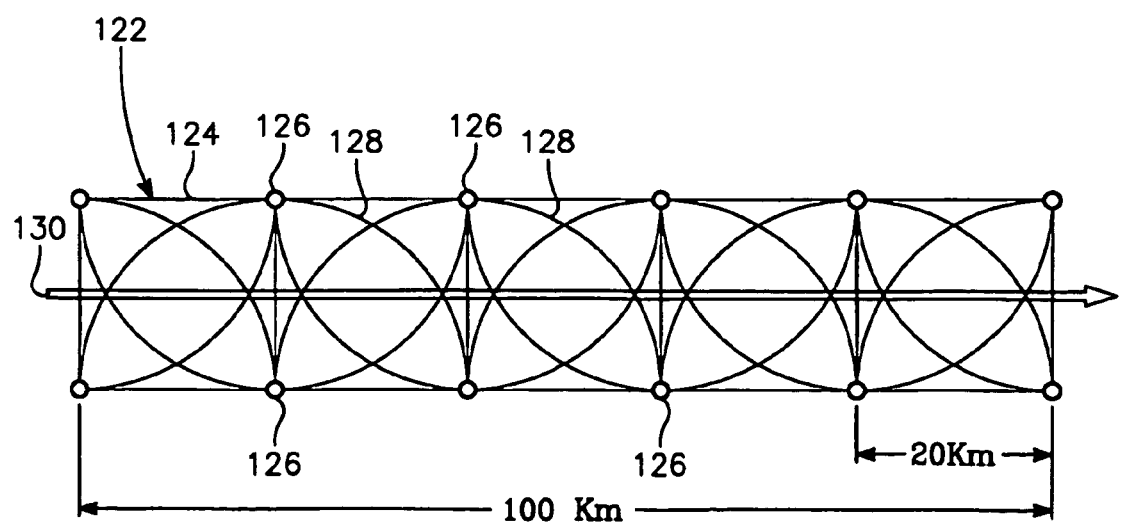
FIG. 15 illustrates a grid of electro-optical sensors for Los Angeles International Airport.

From this data, threat zones 106, 108, 110, 112, 114, 116, 118 and 120 were developed for aircraft takeoffs and landings at LAX (as shown in FIG. 14). Based on these threat zones 106-120, grid-layout patterns were developed (as shown in FIG. 15). The threat zones, designated generally by reference numeral 122, delineated are for nominal conditions, and the middle of published routes for LAX are used. Actual conditions and flight paths vary considerably because of aircraft load, destination, terminal approach, departure traffic, and weather. Thus, the threat zones will have to be expanded accordingly.

On the other hand, missile engagement tactics that seek to maximize its probability of kill tend to reduce the areas of probable engagement on the ground, resulting in the requirement for a smaller area of sensor grid coverage.

Early detection in high vertical-clutter areas, i.e., urban landscapes and mountainous regions where clear line-of-sight is restricted to short distances, higher-performance-long-distance sensors are not required. A higher density distribution of shorter range sensors is desirable, particularly if earlier detections are deemed necessary.

The grid layout 124 comprises 12 electro-optical sensors 126 spaced apart by 20 kilometers to provide missile threat detection capability over a distance of 100 kilometers. Each of sensor 126 has a field of view 128 with a radius of 20 kilometers. As is evident in FIG. 15 the arrival/departure path 130 is generally covered by the field of view 128 of three sensors 126 during the takeoff or landing of an aircraft over the 100 kilometer distance.

An electro-optical sensor incorporating a cryogenically cooled detector operating in the MWIR band has significant performance capabilities for the detection of the launch of a threat missile. The advantages of this particular sensor are that (1) the largest part of the missile's radiant energy resides in the MWIR band, (2) InSb detector material is the most desirable material for high-density focal plane arrays and high-performance IR sensing, (3) the detector offers good uniformity and will hold non-uniformity correction for long periods, and (4) future military programs can procure thousands of these sensors, which will provide systems at reasonable cost.

The UV wave band (solar blind) was found to have relatively excellent low-solar radiation and thus inherently low-clutter background; however, severe atmospheric transmission losses at near sea level altitudes and low-visibility conditions prevent this technology from being a viable candidate for the sensor element of the sensor grid.

The visible band, while not specifically analyzed, was deemed not to be useful because of inherent high clutter in this band.

Limited missile threat LWIR data was analyzed to develop contrast irradiance versus range and compared to the respective sensor NEI (noise equivalent irradiance) values for both cooled and uncooled detector devices. The cooled sensor was found to have range performance half that of the cooled MWIR devices for non-tropical atmospheres. The significantly lower cost of uncooled sensors and the inherently higher reliability of theses sensors will result in lower life-cycle costs, however the uncooled sensor performance is deemed to be unacceptable for the sensor grid, which requires relatively long-range performance.

Sensors based on IR technology with an acoustic adjunct for dense high-rise urban areas are preferred for protecting transport aircraft over land. A land-based radar is the preferred sensor for protecting transport aircraft over water.

There is a need to process the imagery from the optical sensor grid 20, which necessitates the development of algorithms to satisfy image detection requirements These image detection requirements include: 1. a very high probability of detecting actual missile launches; 2. a very low probability of false alarms; 3. operation at video frame rates in affordable computer and video hardware; and 4. compatibility with distributed processing in a network with limited bandwidth.

In the interest of rapid deployment to meet the continuing threat of shoulder launched missiles, the development approach consisted of taking advantage of pre-existing, tested, and documented software as much as possible. For the present invention, the algorithms are be the simplest algorithms which demonstrate adequate performance. These algorithms are designed to be modular, so that more sophisticated and complex algorithms can be inserted to upgrade performance incrementally.

Referring to FIG. 15, the algorithm structure is diagrammed in the block diagram of FIG. 15. Processing is divided into three basic modules: (1) the Single Sensor Processing module; (2) Sensor Pair Processing module; and (3) Central Fusion Processing module.

The Single Sensor Processing module performs digitization and processing of sensor video on a frame-by-frame basis at each individual sensor location/post (step 134). This level of processing is performed at each electro-optical sensor because of network bandwidth limitation. The baseline detection of a potential launch compares pixels to a preset intensity threshold and finds the centroid of groups of adjacent pixels over a preset threshold (step 136). Any well known commercially available off-the-shelf image-processing package can be selected to perform this function. The basic detection data, which must be broadcast on the network/optical grid are a line of sight from each sensor, along with an accurate observation time which is crucial for the correlation process (step 138). In addition image processing may include providing the detection intensity across the sensor grid so that relative comparisons across the sensor grid can be performed to assist in matching the best (highest intensity) sensor detections.

Whenever simultaneous (within N video frame times) missile threat declarations exist from multiple sensors (two or more sensors) with overlapping field-of-views, sight lines for the sensors are tested to determine whether and where they intersect, within uncertainties programmed in for sensor resolution and alignment accuracy (step 140). The computed output of the sensor pair module is a 3-D X,Y,Z coordinate of a point in space (step 142), plus an observation time (step 144). For each simultaneous missile threat detection, unmatched single-sensor detections are assumed to be noise and are discarded to reduce false-alarms. To reduce network traffic, the intersection test algorithm resides in the processors at each sensor location/post. Because the sensor grid 20 is designed to take full advantage of sensor-detection ranges, a determination is made that single sensor detections of a threat missile be compared only with sensors that have overlapping field-of-views.

At the control center of the sensor grid 20, the central fusion process correlates and combines all of the data points generated by the intersection tests performed in steps 142 and 144. The algorithm is a multi-sensor correlator tracker. An added complication in this application of the tracker, however, is that pairs of sensor locations/posts are treated as individual sensor inputs (step 146). As correlated position data build up in a track file over successive video frames, a Kalman filter generates a velocity vector estimate, which can be used to discriminate missile trajectories from almost all other IR emitters in the vicinity of the missile (steps 148, 150 and 152). An alarm is then provided indicating a threat missile is approaching an aircraft.

An alternative algorithm structure includes a Kalman filter which is moved from the third to the second module and develops filtered tracks separately for each pair of posts. The Kalman filter in the third module is then replaced by a simpler weighted-averaging process, which does not need to develop velocities. The advantages of this approach are a reduction in network message traffic and loosening of the requirement to synchronize data received at a central node. However, it is well established in the data-fusion art that fusion results are theoretically optimized if the central process accepts data as close to raw-detection level as possible.

Figure 16:
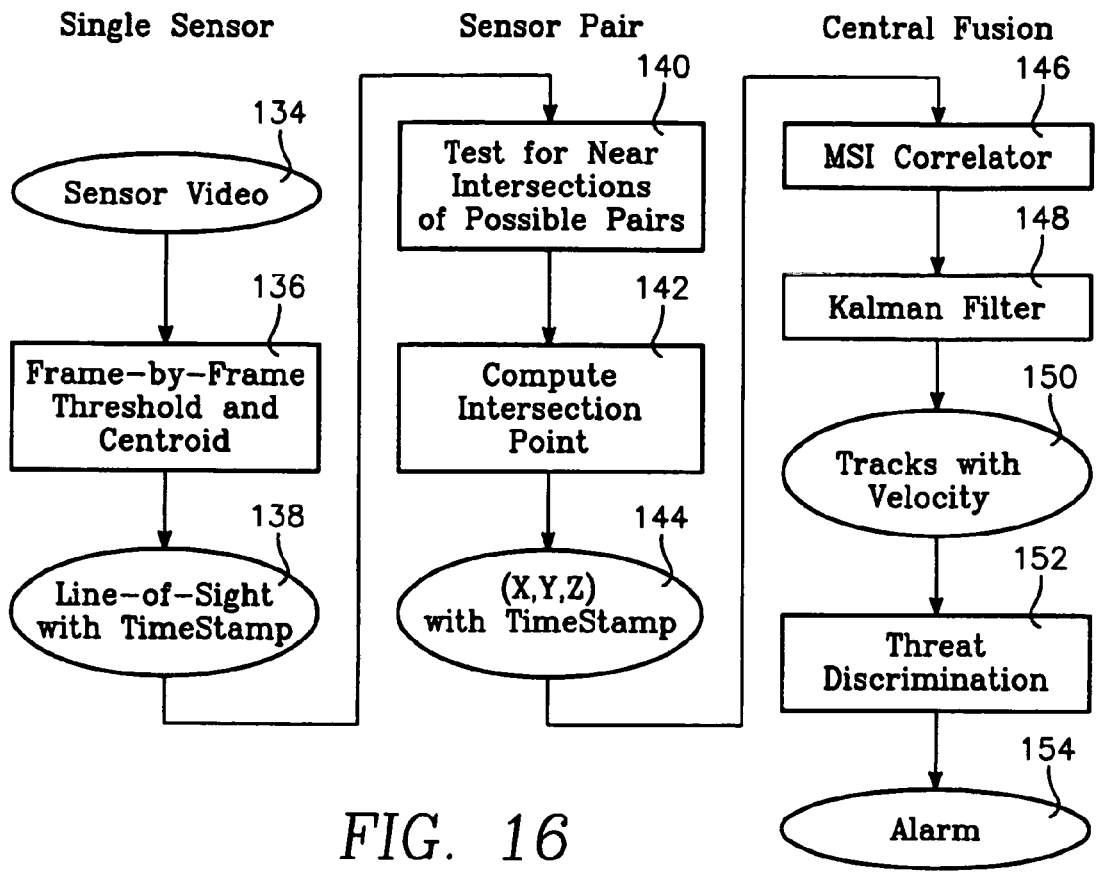
FIG. 16 is a flow chart for sensor processing algorithms which are used to detect and monitor the launch of a threat missile aimed at a target aircraft.

The following discusses the individual algorithm modules illustrated in FIG. 16 in further detail. Step 134 detects a threat missile and acquires the image of the missile. Steps 134, 136 and 138 include the computer and other hardware required to receive (and digitize, if necessary) the incoming image signal, as well as the software tools (drivers) that allow for programmatic access to hardware functions. With many options available, the selection of the components to perform the function was dictated by performance metrics, such as image signal format, processing capabilities, and on-board memory. The ability of a hardware component to be easily upgraded once it has been included as part of a system was also considered. This is primarily for reduction of life-cycle costs and increasing the flexibility of the optical grid 20. In addition, because hardware generally works with a particular image-processing software package, the selection of an image-acquisition card is highly dependent upon the capabilities of the image-processing software supporting the card.

The second component of the threat missile declaration subsystem is an image-processing software package. This package includes a library of functions that perform pixel-level operations on the captured image with the objective of determining the existence and location in the image-space of a threat missile observed by an acquiring sensor. Functions of interest include threshold analysis, image arithmetic, basic morphology, and blob analysis. The final software package needs to provide access to these and other functions on a programmatic level i.e., through a dynamic link library (DLL) file.

Of primary importance for threat missile detection and tracking in imagery is the ability to discern a threat missile from its background. This is directly related to the level of contrast present in the image between the missile of interest and the background setting.

Both the radiant intensity of the threat missile in the spectral region of interest and the amount of background clutter present dictate the functions required for the actual image-processing algorithm. The basic operation consists of isolating the threat missile of interest (if present) and locating it in the image domain, i.e., finding the pixel coordinates of the threat missile's centroid. Different algorithms for analyzing imagery in the UV, visible, and IR regions each having their own advantages.

There is a need for a method of dealing with irregularities in the optical system. Irregularities include optical distortion (pincushion effects) and lens aberration which are common in imaging systems and must be accounted for to obtain maximum detection accuracy.

In the process of selecting the acquisition hardware and processing software, vendors were compared, including National Instruments, InoSys, Coreco, Matrox, and The Mathworks. Their image-processing software was tested on the threat missile imagery collected during the development of the present invention to examine their functions and capabilities and to evaluate their relative performance. Of the vendors compared, Matrox was determined to provide the best set of solutions in both hardware and software. Matrox Electronic Systems Ltd. of Quebec, Canada offered the largest selection of commercial vision processor and frame grabber cards, all supported by their commercially available Matrox Imaging Library (MIL)—a very comprehensive collection of image-processing functions, easily accessible through Visual Basic or Visual C++. Because of Matrox's wide selection of hardware, the system can be scaled or modified to meet the needs of several different airport infra-structures. In addition, because the Matrox Imaging Library is compatible with all hardware Matrox offers, the image-processing software algorithms do not need to be altered if the hardware is upgraded after electro-optical grid system deployment.

The image-processing algorithm is very sophisticated for the electro-optical grid system is very sophisticated. Imagery taken in the visible spectrum could not provide the level of contrast required to distinguish a threat missile plume from the background scenery at all times of the day. This is especially true when the threat missile is viewed against the sky in daylight hours.

The underlying issue with visible imagery is the reduction in contrast caused by the abundance of solar emission in the visible spectrum. To minimize the impact of solar emissions, IR imagery of missile shots were analyzed. In the IR region of the electro-magnetic spectrum, the contrast of the missile plume increases significantly to the background scene. However, solar energy also induces a temperature change in objects within the scene, increasing their contrast ratio. For the purposes of the electro-optical grid system 20, clutter objects of concern are primarily those objects viewable from a vantage point located on or near the ground, tall buildings, clouds, etc. The image-processing algorithm must allow for the missile plume to be isolated from the background clutter. The best method for this isolation requirement is a change-detection algorithm that looks for the differences between successive image frames. By subtracting one frame from its successor frame, the resulting image contains only the new portions of objects, for example, a threat missile that is moving and noise. These objects are then analyzed through a threshold technique and blob analysis to yield their locations in the image domain.

In an effort to further reduce the adverse effects on image processing of the sun's radiation, the acquisition of imagery in the UV region of the spectrum was analyzed. In particular, the portion of the UV region was analyzed in which the solar radiation is completely absorbed by the ozone layer with the idea being that imagery collected in this solar-blind UV (SB/UV) region would be similar to viewing the threat missile in the visible region at night. Contrast between the missile plume and the background would then be maximized. In terms of developing an algorithm to extract data from this type of imagery, simplification occurs. Instead of having to perform change detection to isolate the missile from clutter, a direct threshold and blob analysis can be implemented to find the threat missile. This provides a significant increase in the false-alarm rejection capabilities of the electro-optical grid system, making it a more viable solution.

For the electro-optical grid system, a degree of image stabilization may be required, depending upon the placement of the sensors. In areas of high winds or other vibrations, the detection accuracy of the electro-optical sensors could be dramatically compromised without such stabilization.

The electro-optical grid system of the present invention includes an image-processing algorithm that was developed to handle the varying conditions of the operating environment, such as changes in lighting intensity throughout the day and effects of the diurnal cycle. To accomplish this, algorithms were evaluated for use on imagery in the visible, MWIR, and UV spectral regions with the expectation that each has its own advantages and disadvantages.

In initial testing performed on imagery of missile shots, the distortions introduced by focusing optics were not negligible. When initial testing was performed on-site, the image was Global Positioning System (GPS) registered to a single point in the field-of-view to provide minimal calibration of the optics. After further data analysis, it was determined that the optical distortions caused by the lens were determined to be too extensive. A two-point slope correction, which reduced the errors, was made but it did more to prove the need for a full image plane calibration.

Figure 17:
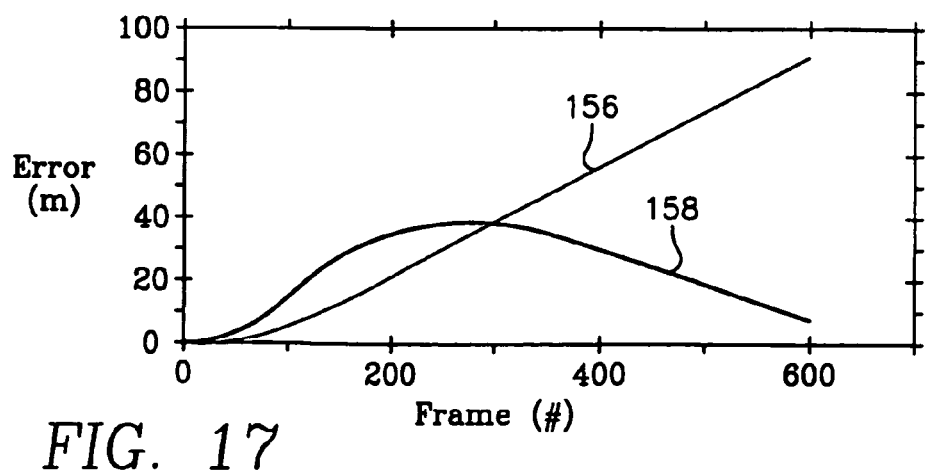
FIG. 17 is a plot which shows imagery system correlation error by frame.

Referring to FIG. 17, the graph of FIG. 17 shows an example of this effect on one of the data-collection systems. As depicted in the single-point correction of plot 156, as the object of interest, e.g. threat missile, moves away from the registration point, errors increase. Using two-point slope correction, which is depicted in plot 158, errors are significantly reduced. To account for this effect in the final configuration, each sensor needs to be calibrated to its optics, especially when wide-angle lenses are used. Commercial software tools are available to do this, the Matrox Imaging Library includes one such tool.

Notional diagrams of the electro-optical sensor grid combined with sensor-costing information indicates the need to maximize the viewing area of each sensor. The simplest solution to this need for maximizing the viewing area of each sensor is to use wide-angle lenses in the optical path. While this increases the viewing area of each sensor, the resolution of the electro-optical grid is degraded. In terms of image processing, this presents design challenges associated with discriminating a threat missile from background noise.

Figure 18:
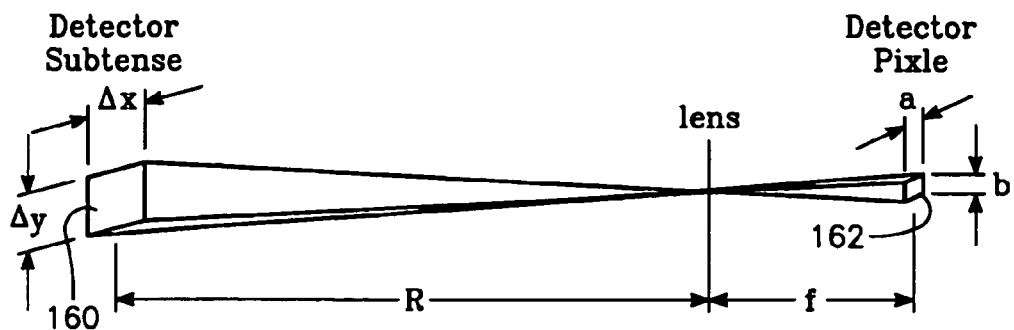
FIG. 18, illustrates the detector showing the coverage area of a single sensor element.

Referring to FIG. 18, the subtense of a single detector pixel is illustrated in FIG. 18. The pixel subtense 160 has dimensions $\Delta x$, $\Delta y$; the pixel has dimensions a, b; the focal length is f; and the range is expressed as R. The subtense dimensions can be expressed as $\Delta x = R*a/f$ and $\Delta y = R*b/f$. For wide-angle lenses, the focal length is greatly reduced, increasing the coverage area per pixel. Another way of looking at it is to say that the same area is covered by the subtense but at a shorter range.

Figure 19B:
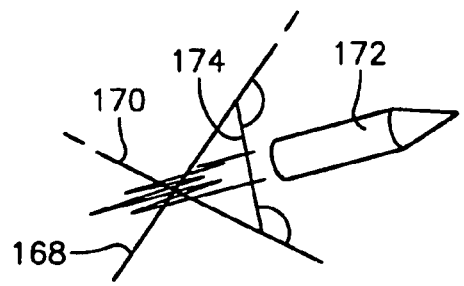
FIG. 19 illustrates sight line intersection geometry which is used to determine whether detections from a pair of sensor intercept.
Figure 19A:
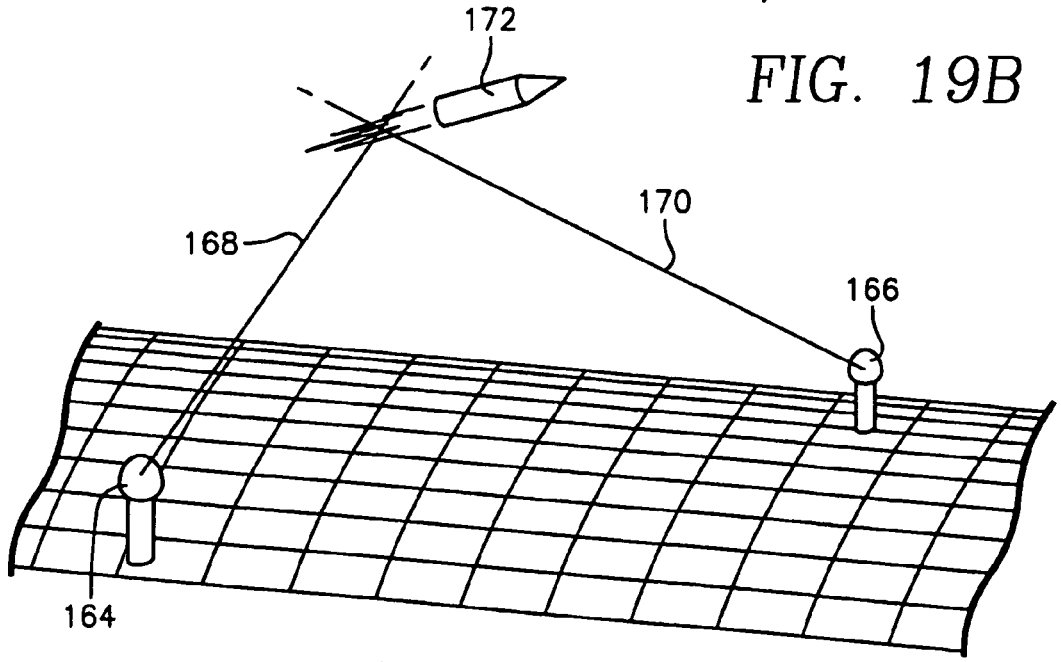

Referring to FIG. 19, the algorithm that determines whether detections from a pair of electro-optical sensors 164 and 166 tracking a missile 172 intersect is relatively simple. The detections are represented as sight lines 168 and 170 in FIG. 19. A line in 3-D space is determined by the coordinates of a point on the line (in this case, the electro-optical sensor 164 or 166 position) and a unit vector parallel to the line (its azimuth and elevation converted to direction cosines). For two lines 168 and 170, that are not parallel, the shortest line segment 174 connecting the sight lines 168 and 170 is perpendicular to each line 168 and 170, therefore, the dot product its unit vector with the unit vectors for both sight lines is zero. This condition determines the direction of the connecting line 174; its unit vector is the cross product of the sight-line 168 and 170 unit vectors. Once this is solved, the requirement that the connecting line intersect both sight lines reduces to a system of three linear equations in three unknowns.

When two sight lines actually intersect, the length of the connecting line is zero, and its direction undefined. This intersection of the two sight lines 168 and 170 is very unlikely, given finite sensor resolution and misalignment. However, the algorithm test for intersections, as well as for parallel sight lines.

Figure 20:
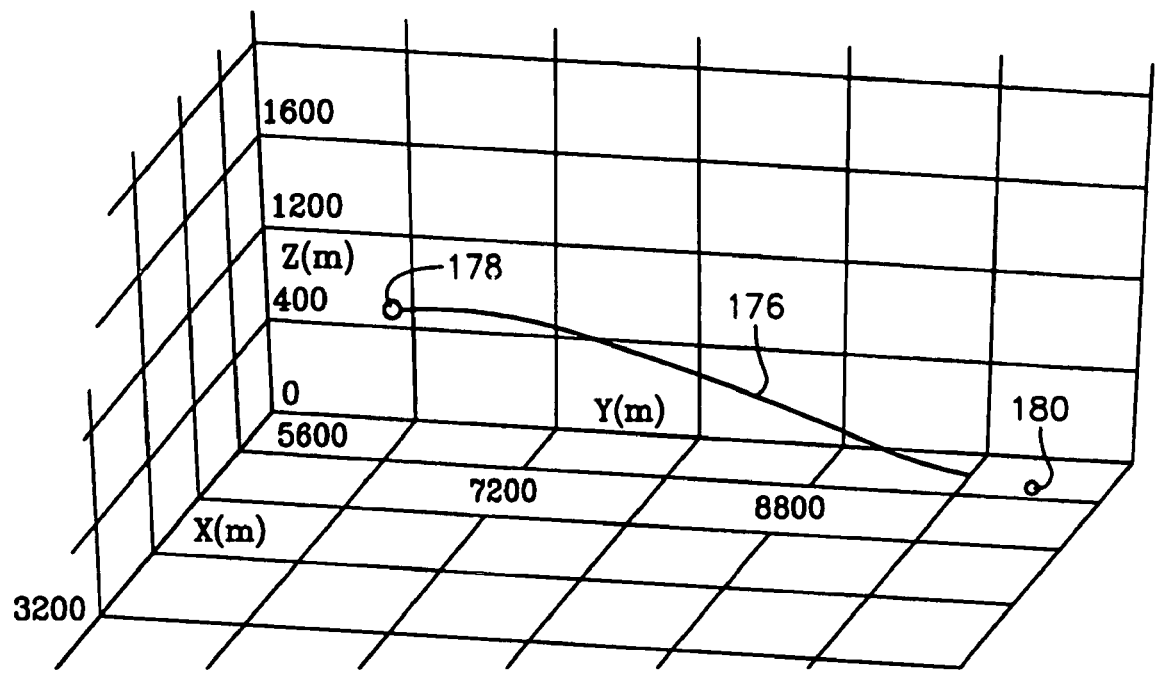
FIG. 20 illustrates a threat missile launch trajectory.
Figure 21:
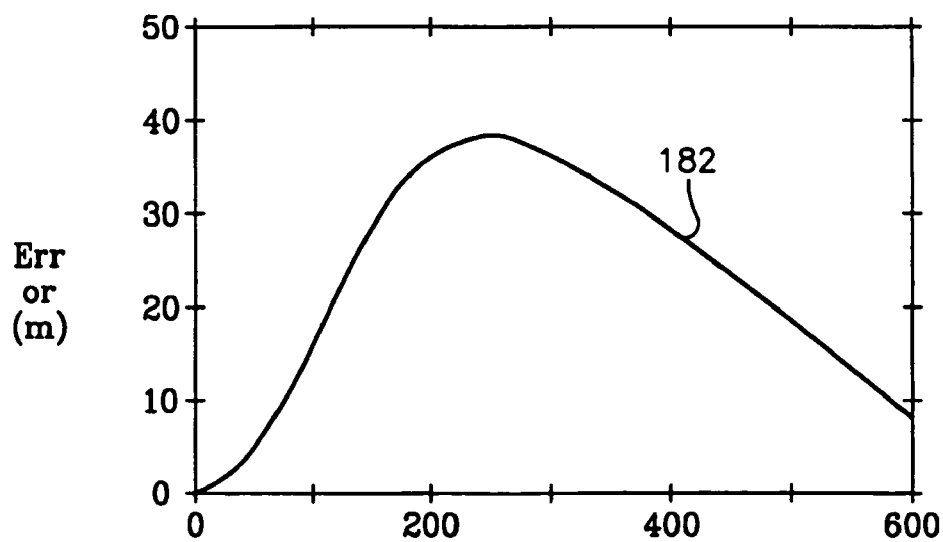
FIG. 21 is a plot depicting minimum separation distance between sight lines as a function of flight time.

Referring to FIGS. 19, 20 and 21, the intersection calculation was tested with the image data collected with two electro-optical sensor posts. A typical reconstructed trajectory is illustrated by the plot 176 of FIG. 20. In FIG. 20 point 178 designates the launch point and point 180 designates the target point.

FIG. 21 illustrates a curve 182 of the closest approach distance between sight lines as a function of flight time. The reason for the shape of the curve 182 is that precise information on the sensor pointing directions was not available from data collection; the relative alignment of the sensors was determined from the imagery, by requiring the two pairs of sight lines 168 and 170 in the launch video frames and in the impact video frames to have zero closest approach distance.

To verify the accuracy and functionality of the correlation algorithms when more than two sensors were monitoring the flight of a threat missile, a software simulation was performed and analyzed. The simulation provided correlation algorithms image data from a grid of eight sensors monitoring the flights of two aircraft. The resulting output from a correlation module was track files indicating the position of the target aircraft detected in the geo-spatial coordinate system. In this and other similar simulations, the target aircraft were detected by the correlation module to be within a few meters of the actual simulation targets, thus validating the algorithms. In terms of computation power, it is a relatively straightforward task for the correlation algorithm to operate on the simplest case a single threat to a target detected by two electro-optical sensors. However, when the correlation algorithm operates on multiple threats to one or more targets or more than two sensors are involved computation time is adversely effected. In this situation, threats include actual targets as well as false alarms such as moving background clutter.

Another approach to managing the correlation process workload is to manage the network communications protocol. The nearest neighbor approach was chosen wherein potential launches of a threat missile reported by a sensor are only shared with the other sensors with overlapping fields of views.

Table II shows some different cases that were experienced by the correlation algorithm and the worst-case computation time required in each threat scenario. For the simplest case, the algorithm can operate at a rate capable of supporting 201 frames/s of 512 by 512-pixel 8-bit imagery, which combines the time required for image processing (IP) with the time taken to calculate a correlation.

TABLE II

Correlation Time for Various Scenarios.

| Events (m) | Sensors (n) | IP (ms) | Corr (ms) | Total (ms) | Fps |
|---|---|---|---|---|---|
| 1 | 2 | 4.50 | 0.476 | 4.97 | 201 |
| 1 | 3 | 4.50 | 1.43 | 5.93 | 169 |
| 1 | 4 | 4.50 | 2.86 | 7.36 | 136 |
| 2 | 2 | 4.50 | 1.90 | 6.40 | 156 |
| 2 | 3 | 4.50 | 5.71 | 10.2 | 97 |
| 2 | 4 | 4.50 | 11.4 | 15.9 | 62 |
| 3 | 2 | 4.50 | 4.28 | 8.78 | 113 |
| 3 | 3 | 4.50 | 12.9 | 17.4 | 57 |
| 3 | 4 | 4.50 | 25.7 | 30.2 | 33 |
| 5 | 2 | 4.50 | 11.9 | 16.4 | 60 |
| 5 | 4 | 4.50 | 71.4 | 75.9 | 13 |
| 5 | 5 | 4.50 | 113 | 124 | 8 |
| 5 | 6 | 4.50 | 179 | 183 | 5 |

In a worst case scenario, it is assumed that every time frame is independent and ignorant of the previous correlations already completed. The worst case scenario involving m observed missile threats/events and n sensors results in a latency equation of $t_{m,n}=(0.476)*m^2*(n^2-n)/2$. At this rate of increase, it does not take a large number of observed missile threats/events and/or sensors to render the algorithm latency ineffective for a real time system. For this reason, processing of potential targets to reduce false alarms must be applied prior to reaching the correlation phase. With very short delays there is a need to detect all real events while maintaining a low false alarm rate which is normally a mutually exclusive set of requirements. However, because of the fact that the majority of the real observations of threat missiles result in uniform and predictable movement across the sensor field of views, there is normally not a situation where a full m by n correlation is required before a threat anomaly is declared. In other words, by maintaining a set of tracking algorithms, the sudden presence of a new target and its subsequent correlation is normally independent of the number of latent observations already in the sensor FOV. Likewise, having knowledge of the overlapping sensor field of views of the grid sensor array allows for a judicial pruning of other sensors, which corroborates the validity of the sensor detecting a threat missile.

Initial studies into a solution to the correlation time computation problem illustrated in Table II point toward the use of a real-time operating system to speed up computations. Since the values for computation times in Table II originated on a PC running Microsoft Windows 2000 Professional with all overhead software running, the software is subordinate to the Windows operating system. When the algorithm performs correlation calculations, it must share CPU time with any other tasks currently running. While several real-time operating systems are on the market today, such as VxWorks, Unix, etc., the system is constrained to the Windows environment because of requirements of the frame grabber hardware drivers provided by Matrox.

Four solutions were considered to solve the problem of sharing CPU time. The first option is developing the correlation software using a program InTime, which is commercially available from TenAsys Corporation of Beaverton, Oreg. InTime software is a real-time application software that can be run to preempt Windows and have the highest priority access to the CPU for performing calculations.

The second option is to deploy a computing system on a real-time chassis such as PXI which includes a high-speed PCI bus with integrated timing and which is commercially available from National Instruments of Austin, Tex. With the PXI real-time chassis, National Instruments supplies frame grabbers, and the operating system is a real-time environment.

The third solution is to develop custom hardware upon which the Microsoft Windows Embedded operating system could be deployed, thus eliminating many of the overhead tasks running on the PC platform.

The fourth solution, using commercially available hardware with drivers developed in-house for use on a real-time operating system, such as VxWorks, which is commercially available from Wind River of Alameda, Calif.

Each of the above solutions has its unique advantages and will work effectively in the present inventions. At this point a custom application is believed to be optimal over a general purpose PC. The custom application will be more cost effective for a large scale deployment of sensor grid. However, the custom application must be able to accept improvements to the algorithms made available during upgrades to the system.

The threat missile coordinates created in the sensor-pair intersection module illustrated in FIG. 16 are transmitted to the central node of the sensor grid network, where they are the input data of the central-fusion process also illustrated in FIG. 16. This process is a fairly simple multi-sensor tracker composed of two core modules. The tracker structure is illustrated in FIG. 22.

Figure 22:
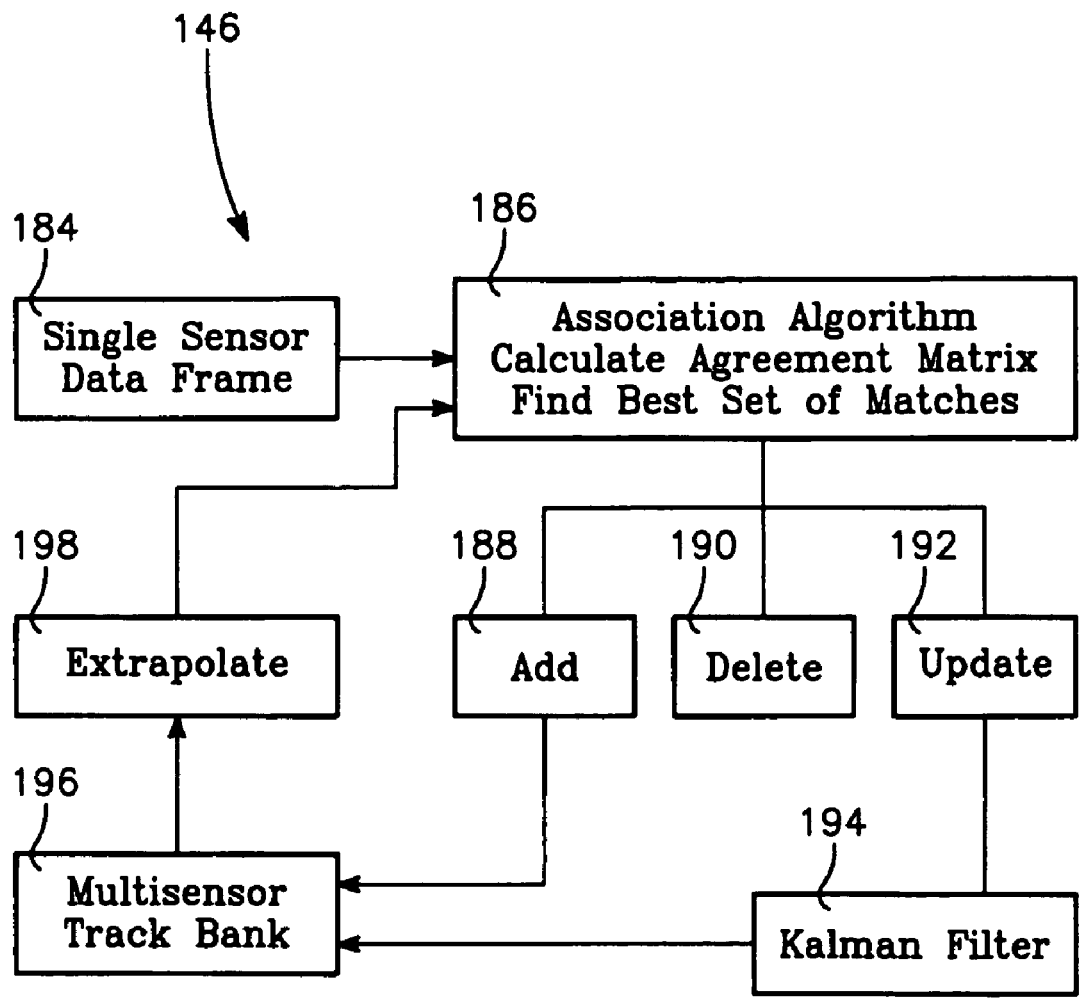
FIG. 22 is a block diagram illustrating the structure of MSI (multi-source integration) multi-sensor tracker.
Figure 27:
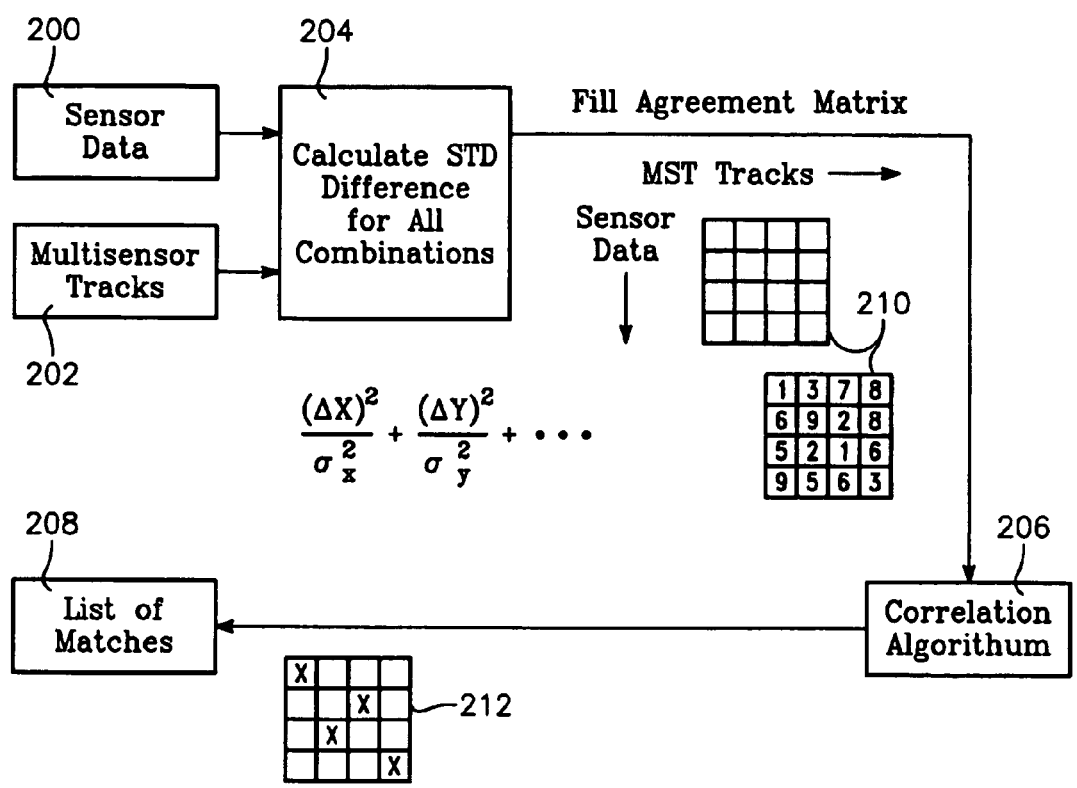
FIG. 27 illustrates the structure of a correlation process for a frame of data.

Referring to FIGS. 16, 22 and 27, each time a frame of data 184, which includes a full set of intersections from a pair of sensor posts 164 and 166, for a specific point in time is received, the correlation process (block 186 and FIG. 22) calculates the standard difference (block 204) between each detection in the set and each existing fused track file, extrapolated to the observation time. This quantity is a measure of the probability that the new observation sensor data 200 and the existing multi-sensor track 202 were produced by the same physical object, i.e. a threat missile. Gaussian noise statistics are factored in the correlation process.

At this time it should be noted that Multi-Source Integration multi-sensor tracker 146 of FIG. 22 includes add 188, delete 190 and update 192 capabilities, a Kalman filter 194, a multi-sensor track bank 196 and extrapolation capabilities 198.

The actual correlation algorithm (block 206) operates solely on a matrix of standard differences. The correlation algorithm 206 attempts to find the set of one-to-one matches 208 between rows (sensor data/observations illustrated in charts 210) and columns (MST tracks also illustrated in charts 210) such that the sum of elements in the matched intersections is minimum as shown in chart 212. This set of matches 208 maximizes the overall probability that the assignments illustrated in FIG. 27 are correct. This is a single-best-hypothesis approach, as opposed to the more complex and time-consuming multiple-hypothesis techniques now used by many fusion systems.

Well-known search algorithms, such as the branch-and-bound and auction techniques, have been proven to find optimal solutions for the assignment problem. Unfortunately, the execution time of these algorithms is not well defined. Therefore, to meet the timing requirements, a simple heuristic correlator was used, which has a well-defined execution time. Although not optimal, the correlator finds the optimal solution a high percentage of the time, particularly in cases where sensor errors are caused by boresight misalignment.

Figure 23:
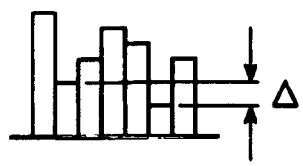
FIG. 23 illustrates the deepest hole algorithm used in the correlation process of FIG. 22.

The concept of a deepest hole algorithm is diagrammed in FIG. 23. First the row or column in the agreement matrix which has the largest difference delta between the minimum and next largest elements is found. This difference is a measure of the relative probability of the corresponding two assignments. The match corresponding to the minimum element is least likely to be reassigned by a full optimal solution. The row and column containing the minimum from the matrix is removed and the process repeated.

The correlation process also includes functions for track file maintenance. Unmatched detections result in the creation of new tracks; tracks that remain uncorrelated with detections eventually are dropped.

Figure 24:
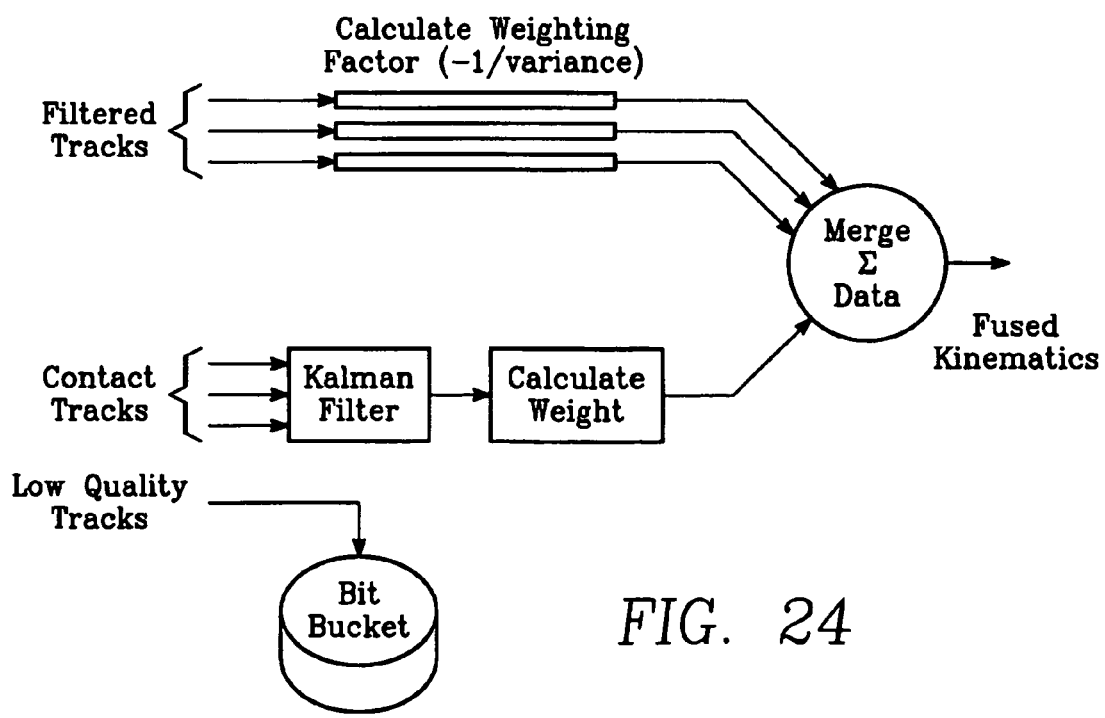
FIG. 24 illustrates a weighted averaging process for combining tracked single sensor data.
Figure 25:
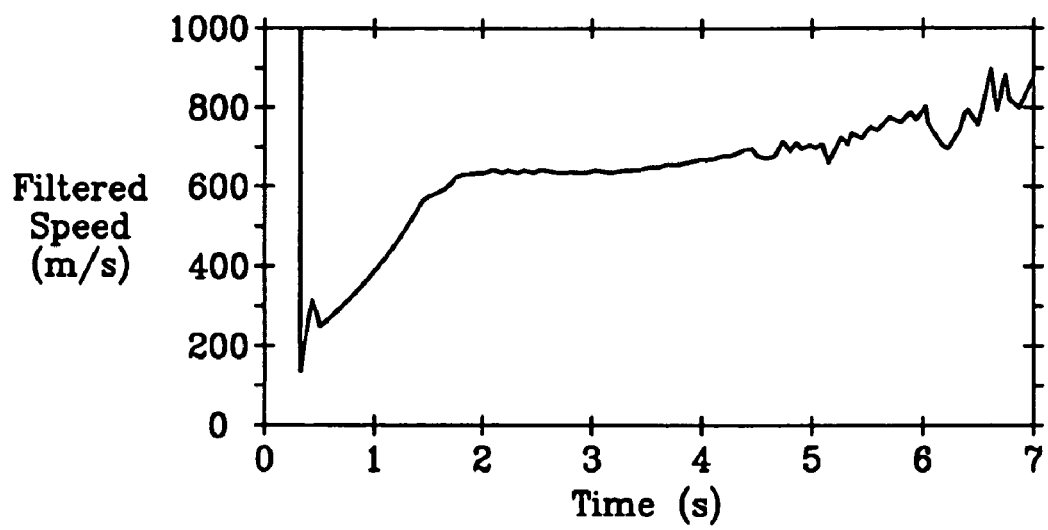
FIGS. 25 and 26 depict a velocity estimate and its estimated variance for launch data from a threat missile.
Figure 26:
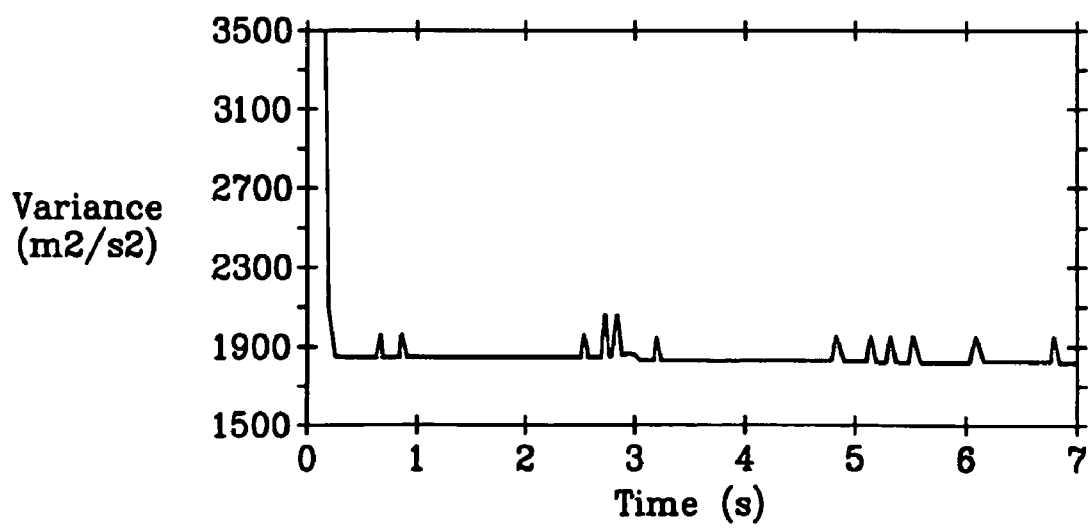

The second module of the fusion process is a simple Kalman filter 148, which generates velocity estimates from successive position updates. Filter 148 is used only for data from sensors that do not have internal tracking systems. Tracked single-sensor data is combined by a weighted-averaging process, which is illustrated in FIG. 24. FIGS. 25 and 26 show the velocity estimate and its estimated variance for the launch data analyzed in FIGS. 18 and 19. After eight frames of detections from both sensor posts 164 and 166, the velocity variance (FIG. 26) settles to its steady-state value, corresponding to an error estimate of about 40 m/s.

An imaging sensor responsive in the MWIR region is a viable solution for detecting a threat missile. In the MWIR region, enough contrast is present in the imagery to allow for the reliable detection of threat missiles launched against commercial aircraft. The image-processing algorithms, which have been developed and tested, serve well in this capacity.

The algorithms developed for correlating data from multiple imaging sensors have been tested and verified to be accurate. The Multi Source Integration central fusion algorithms have been developed, and their reliability has been proven in the past on similar systems.

In a ground-based launch-detection system, a secure, reliable, low-latency network is essential in providing node-to-node connectivity between optical sensors and connectivity from the sensor grid to the airborne countermeasure dispenser on a commercial aircraft. The network required to send a threat alert is divided into three network components is set forth in the following discussion.

A Distributed sensor network grid component provides connectivity between adjacent sensor nodes. A Sensor grid to central node component links nodes in the sensor grid to a central node. A Central node to CM dispenser located on the aircraft links the ground-based central node to the aircraft-based countermeasure dispenser.

The two most important characteristics required of the three network components are low latency and high availability. The time available to dispense a countermeasure from an aircraft, once a threat missile has been launched, has been determined from studies to be between 3 and 10 seconds, dependent on slant range between launcher and the intended target. Only a small fraction of this time can be allocated to the required networking of the sensor grid. Thus, the system availability must be very high, which implies high reliability, low maintenance, and fail-safe operation; and the network must be efficient with minimal delays.

Trade studies were performed to evaluate the feasibility of several network topologies and technological options. In these trade studies, the four most important factors in the evaluation process were latency (throughput), availability (redundancy), security, and cost.

By comparing wire line and wireless technologies to provide the connectivity between sensor nodes, it was found that both solutions are technologically viable, as can be seen in Table III. In table III, each network characteristic is given a relative score between 0 and 5, with 5 being the best.

TABLE III

Wire line Versus Wireless.

| Lat. Score | BW Score | Ava. Score | N.S. Score | P.S. Score | Cost Score |
|---|---|---|---|---|---|
| 5-ns | 5-THz | 5-100% | 5-100% Secure | 5-100% Secure | 5-Inexpensive |
| 4-s | 4-GHz | 4-99.9% | 1-Security breach likely | 1-Security breach likely | 1-very expensive |
| 3-ms | 3-10 MHz | 3-99.0% | | | |
| 2-0.1 s | 2-1 MHz | 2-95% | 0-Security breach definite | 0-Security breach definite | |
| 1-1 s | 1-1 Kilo | 1-90% | | | |
| 0->1 s | 0-<1 Kilo | 0- <90% | | | |
| 4.5 (fiber) | 4.5 | 4.5 | 4.5 | 4 | 2 |
| 4 (wireless) | 3 | 4 | 4 | 3 | 4 |

Table III factors include latency, bandwidth, availability, network security, physical security and cost.

Both wire line and wireless support the low-latency requirements of a portable ground-based launch-detection system, although a wire line network will have less latency. One contributor to latency that not acceptable is insufficient bandwidth; thus, the network topology is designed to eliminate any possible bandwidth bottlenecks in the system. The availability for both wireless and wire line is in the 99 percentile region. The network is functional at all times to provide the detection of a threat in a timely manner. At the same time, if a node malfunctions, all of the neighboring nodes are required to identify the failure so as to provide coverage for the failed node. Thus, the individual system components/links have strong network management capabilities to account for and resolve any component and link failures.

Several network types were considered in a trade study for use the preferred embodiment of the present invention including a Full Mesh Network, Meshed Neighbors Network, Bus Network, Star Network and Token Ring Network.

In the Full Mesh Network every node has a connection to every other node in the network. The network is limited by router throughput at each node. Each node will be receiving and sending data to and from all other nodes in the grid system. If a dedicated link goes out then the connection can be rerouted through another sensor. There are a significant number of physical connections to secure.

There are also a significant number of cable runs and/or wireless connections with each requiring security. For example, the Links Required for a 20-node system is approximately 185.

In the Mesh Neighbors Network Neighbor each node has a connection to every other neighbor node in the network. The network is limited by router throughput at each node. Each node will receive and send data to and from only neighbor nodes. If a dedicated link goes out then the connection can be rerouted through another neighboring sensor. There are approximately a quarter of the physical connections of the Full Mesh network. Approximately one-quarter the cable runs and/or wireless connections as compared to the Full Mesh network. For example, the links Required for a 20-node system would be approximately 45.

In the Bus Neighbor Network all nodes are connected to a central cable/bus. The network is limited by bus and NIC throughput. All data from each node is sent through the bus. A single point of failure at the bus may require the use of multiple buses to create redundancy. One physical connection per node is required. One cable run and/or wireless connection per node required. For example, the links required for a 20-node system is approximately 20.

In the Star Network all nodes are connected to a central hub. Nodes communicate across the network by passing data through the hub. The network is limited by hub/router throughput. All data from each node will be sent through the stars central hub/router. Single point of failure at hub/router may require the use of multiple hubs to create redundancy. One physical connection per node required. One cable run and/or wireless connection per node required. For example, the links required for a 20-node system is approximately 20.

In the Token Ring Network, all nodes are connected to one another in the shape of a closed loop, so that each node is connected directly to two other nodes, one on either side of it. The network is limited by cable throughput. All data is sent around the ring until the receiver node is reached. If a link between two nodes is lost, then the ring is broken; thus data is lost. There is no redundancy unless multiple rings available. Two physical connections per node are required to create the closed loop. Nodes are connected to their nearest neighbors creating a closed loop. For example, the links required for a 20-node system is approximately 21.

The network security for a wireless network is at risk at the RF interface, but with a proper implementation of encryption and other security schemes the risk is reduced to an acceptable level. If the network is compromised, the problem could be detected immediately with the proper network management tools. Thus, a solution to each security failure scenario is generally predefined, and when a breach occurs, the proper remedy can be implemented.

The physical security of a wireless network is more vulnerable than a wire line network due to exposure of the antennas. However, the security required for the IR sensors at each node can provide security for the network's collocated antennas, and with the proper alarming of the physical site and network management, the physical security risks are minimized. The factor that separated the wireless and wire line solutions in the trade study was cost. The major risk in using wire line is the potential cost of laying and/or leasing the fiber cable required in this network topology.

Network were analyzed for feasibility. Comparing the Full Mesh network and Meshed Neighbors network, both have significant redundancy. The Meshed Neighbors network has more throughput capability because messages are sent only to the neighbors, thus decreasing the throughput required at each node. The network security of each topology is a risk as a result of the number of links required although a significant portion of the risk attributable to network security can be absorbed with the proper security schemes and network management.

To implement either of the mesh network topologies with a wire line solution is very expensive because of the expense of laying new fiber cables or leasing fiber cables for every link. The Meshed Neighbors network would require approximately a quarter of the links of the Full Mesh Network but is still very expensive since it uses a wire line design. With a wireless network, the Meshed Neighbors network would be much less expensive than the Full Mesh network because the link budget design is much less complex. Also, the Meshed Neighbors network will need very few node hops to complete each link; while, the Full Mesh network will have approximately half its links completed by node hops. Therefore, whether wireless or wire line connectivity is utilized, the overall expense and complexity of the total system will be much more manageable with the Meshed Neighbors network.

The most feasible network scheme for the distributed sensor network electro-optical grid is the Meshed Neighbors network with wireless links. A wireless connection at each node can be set up to broadcast out to all its neighbors. Because of the possible amount of messages required of the network, the wireless Meshed Neighbors network is the most cost-effective solution. The other topologies require more infrastructure and/or much more expensive equipment.

The throughput requirements of the Meshed Neighbors network does not exceed 10-Mbps at each node. The throughput calculations were calculated assuming an extreme case of 25 neighbor nodes, with a 30-frame/s IR sensor and 10 threats per frame seen at each sensor. Also, the packet size per threat was assumed to be 64 bytes.

Initial studies performed on different protocols found that the industry standards available provide a durable protocol design for most network topologies available. In fact, most off-the-shelf network components available are designed to the IEEE 802 standards. The IEEE 802 standards cover both wire line and wireless technologies and define the functionality of the lowest two layers of the network (i.e., physical layer and data link layer), as well as the higher layers as they relate to Internet working and network management.

The wireless Meshed Neighbors network with the required network security can be implemented with very reliable off-the-shelf hardware/software. In fact, this network solution allows for network expansion/growth to occur with very little impact on the existing network. Assuming neighbor sensors will have a line of sight to each other and the original grid is designed with the expansion in mind, adding wireless network links to additional nodes in the future will have a minimal impact. The additional design consideration required for any future expansion will add very little cost to the original network grid.

The connectivity between the sensor grid and the central node ideally occurs by means of a wireless broadcast from each sensor node, thus taking advantage of the current wireless network being used for the sensor grid. In some cases, when a line of sight does not exist between a network node and the central node or when the distance between the nodes is too large, an intermediate node can be used as a repeater (node hop) to provide a link to the central node. Sending the data through an additional wireless network node will create additional latency, but the added latency will be minimal.

The communication from the ground-based central node to the aircraft-based countermeasure dispenser is implemented through an RF link. The uplink to the counter measure dispenser needs a low-latency connection. This is accomplished with a fairly simple wireless connection from the central node to the front end of the countermeasure dispenser.

In the downlink, the central node of the sensor grid will receive S-mode transponder data from each aircraft to determine which aircraft are in the area and then send a threat alert through the uplink only to the countermeasure dispenser of the aircraft being targeted. Because the S-mode transponder already sends the aircraft identification and GPS coordinates in a downlink, the data from each aircraft can be captured at the central node. An S-mode transponder receiver and antenna is provided at the central node to collect this data from each aircraft. In fact, a transponder receiver and antenna may be needed in multiple locations within the threat area to guarantee the transponder data from all aircraft are received.

Figure 28:
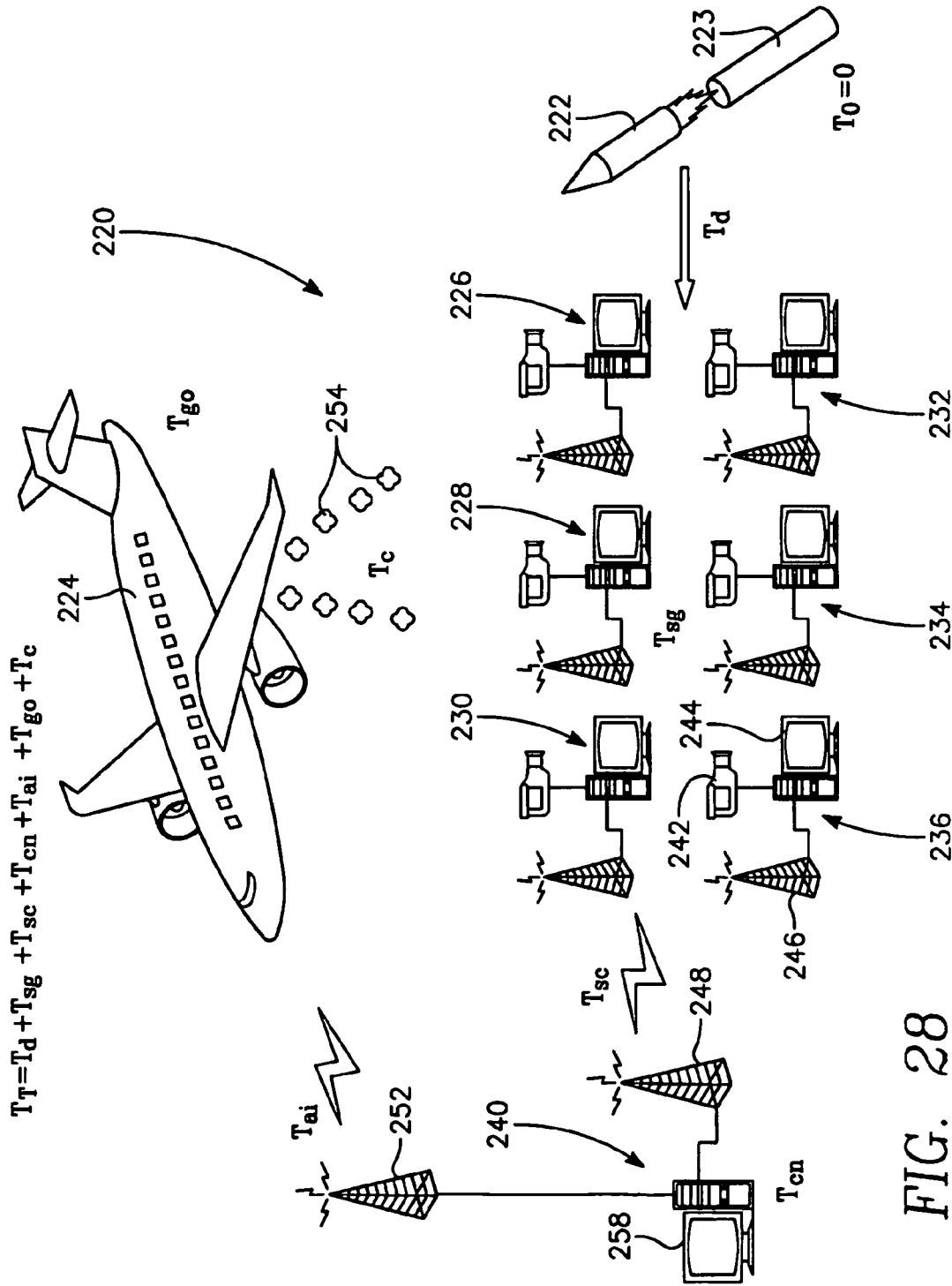
FIG. 28 illustrates the ground based air defense system comprising the present invention.

Referring to FIG. 28, FIG. 28 illustrates the network 220 for detecting the launch of a threat missile 222 launched from a shoulder fired missile launched 223, which targets a commercial aircraft 224. Each sensor node 226, 228, 230, 232, 234 and 236 broadcast all potential threat data to its neighbor sensor nodes. Once the threat missile 222 is verified, the threat data will be sent to the central node 249. The central node 240 will then determine (by S-mode data) which aircraft in the vicinity are potential targets and send a dispense signal to the threatened aircraft 224. Each sensor node 226, 228, 230, 232, 234 and 236 includes an electro-optical sensor 242, data processing computer and video monitor 244 and an antenna 246 for communicating with the central node 240 via a wireless link. The central node 240 includes an antenna 248 for communicating with each of the sensor nodes 226, 228, 230, 232, 234 and 236 data processing computer and monitor 258 and an antenna 252 for communicating with the aircraft 224 via an RF link.

To successfully counter a threat missile 222, the threat missile must be detected and the countermeasure 254 deployed in as little as a few seconds. Because of the number of the system components required to successfully implement a ground-based detection system 220, each component from the sensor grid to the countermeasure dispenser needs to respond very quickly.

FIG. 28 provides a system perspective of the latencies that exist from the time a missile 222 is launched until a countermeasure 254 is dispensed successfully. The potential latency components in the Ground-based Detection System 220 are identified as follows:

$T_T$ Overall ground-based detection system latency.

$T_d$ Time from which a missile is launched until it enters the detectors field of view.

$T_{sg}$ Time required to detect, process, correlate and verify the threat missile image in the sensor grid.

$T_{sc}$ Data transport time from sensor grid to central computer at the central node. All delays on this link due to network security schemes, network management or redundancy are included in $T_{sc}$.

$T_{cn}$ Time required to process threat data from sensor nodes and decide which aircraft(s) is being threatened.

$T_{ai}$ Time required to transport 'Go' decision to CM dispenser on aircraft from central computer.

$T_{go}$ Time in which the 'GO' signal is received until the countermeasure is dispensed.

$T_c$ Time required for the countermeasure to become effective.

At the bottom of FIG. 28, a threat missile 222 is launched, and it takes $T_d$ to detect the launch at a sensor node 226, 228, 230, 232, 234 or 236 on the sensor grid. The time until detection ($T_d$) will be assumed to be 1 second, which puts the missile 222 approximately a tenth of a mile into flight.

The estimate of the sensor grid time delay ($T_{sg}$) is based on the following assumptions. The frame rate of an electro-optical sensor 242 is assumed to be 30 frames/s. The frames are then sent in 33-ms intervals. When the threat missile 222 is detected, the image processing of the frame will require 5 ms. Once the image processing is completed and the threat pixel information formulated, the pixel data for the frame is broadcast to the other neighbor sensors. Less than 10 ms will be required to successfully transmit the pixel data to the neighboring sensors. The image processing and successful broadcast of the threat data for the first frame will begin after the first frame is complete (33-ms). Thus, the time until the threat data from the first frame has been broadcasts one sensor node 226, 228, 238, 232, 234 or 236 to the neighbor nodes may be as low as 50-ms.

The intersection correlations for frame one of the threat may began within 50-ms of the first detection at a neighbor node. The time required to perform the correlation depends on the number of sensors that see the threat and the total number of threats. For a worst-case scenario, from Table II, a correlation time of 200 ms will be used in this latency estimate. The process of detecting the threat through the intersection correlation is assumed to be repeated in a range of from two to six times before final acceptance of threat. Thus, the total time to perform sensor grid processing and transmittal to all neighbor sensors is equal to 6 frames*50 ms/frame+200 ms=500 ms=$T_{sg}$ Because the correlations are processed in parallel to all other processing, the sixth frame correlation is the limiting factor in the equation. The transport time required from the sensor grid to the central node 240 ($T_{sc}$) should be no more than 10 ms. Also, the time required to complete the central node 240 processing ($T_{cn}$) should be no more than 200 ms.

The RF delay between the central node 240 and the targeted aircraft 224 ($T_{ai}$) is not expected to exceed 100 ms.

This large value is used here to represent the worst case latency for the interface between the central node 240 and the aircraft 224.

The time required for the countermeasure dispenser on the aircraft 224 to receive the threat signal and initiate the dispense signal to the CM ($T_{go}$) is assumed to be 10 ms. Also, the time required to dispense the countermeasure 254 far enough away from the aircraft to be successful ($T_c$) is assumed to be 0.25 second. Thus, the overall Ground-based Detection System 220 latency ($T_T$) is approximately 2 seconds.

The total time available from the time the threat missile 222 is launched to the time required to dispense countermeasure 254 far enough away from the aircraft 224 to successfully decoy the threat missile 222 must be no more than a few seconds.

While the present used an aircraft deployed countermeasure system, it should be understood that a ground based countermeasure system can be just as effective as an aircraft countermeasure system to prevent an attack by a shoulder launched cruise missile. Specifically, the ground countermeasure systems which would be effective against a shoulder launched missile are a laser system and an RF countermeasure system.

What is claimed is:

1. A method for protecting aircraft from being attacked by a missile which is launched in proximity to a flight path at an airport comprising the steps of:
   (a) detecting the launch of said missile which is targeted at said aircraft traveling along the flight path at said airport;
   (b) monitoring said missile as said missile travels towards a targeted aircraft on an intercept path with said targeted aircraft;
   (c) generating sensor video of the launch and flight of said missile as said missile travels towards the targeted aircraft on said intercept path, wherein a plurality of electro-optical sensors forming a grid are positioned in proximity to said flight path to generate said sensor video;
   (d) processing said sensor video utilizing a plurality of digital computers, one of said digital computers being associated with and connected to one of said plurality electro-optical sensors to receive and process said sensor video generated by said electro-optical sensor;
   (e) comparing pixels within said sensor video to determine which of said pixels exceed an intensity threshold and then finding a centroid for groups of adjacent pixels which exceed said intensity threshold, said centroid for each of said groups of adjacent pixels being representative of current position coordinates for said missile on said intercept path;
   (f) generating sight line data for each of said plurality of electro-optical sensors, said sight line data being generated by processing said centroid for each of said groups of adjacent pixels, said sign line data generated for each of said plurality of electro-optical sensors representing sight lines between said missile and each of said plurality of electro-optical sensors as said missile travels along said intercept path;
   (g) broadcasting said sight line data over said grid to each of said digital computers within said grid;
   (h) processing said sight line data to determine when one of said sight lines intersects with another of said sight lines for a pair of electro-optical sensors having overlapping field of views wherein said digital computers within said grid process said sight line data to find each intersection of sight lines of said electro-optical sensors having overlapping field of views;
   (i) generating three dimensional X,Y,Z coordinates of a point along the intercept path of said missile whenever one of said sight lines intersects with another of said sight lines for said pair of electro-optical sensors having overlapping field of views and an observation time for said three dimensional x,y,z coordinates wherein each of said digital computers within said grid generate said three dimensional X,Y,Z coordinates;
   (j) transmitting said three dimensional X,Y,Z coordinates generated by each of said digital computers within said grid to a central processor;
   (k) correlating said three dimensional X,Y,Z coordinates generated by each of said digital computers within said grid to generate a velocity vector which discriminates missile trajectory from infrared emissions in proximity to said missile; and
   (l) identifying which of said aircraft on the flight path at said airport are target aircraft of said missile.

2. The method of claim 1 further comprising the step of sending a dispense countermeasure signal to said target aircraft, wherein an antenna connected to said central processor transmits said dispense countermeasure signal to said target aircraft via an RF (radio frequency) link.

3. The method of claim 2 wherein said target aircraft upon receiving said dispense countermeasure signal releases a countermeasure to deceive said missile and re-route said missile from said flight path.

4. The method of claim 1 wherein approximately one half of said electro-optical sensors within said grid are positioned on one side of said flight path equidistant from one another, and the other half of said electro-optical sensors within said grid are positioned on the opposite side of said flight path equidistant from one another, wherein said electro-optical sensors adjacent to one another have said overlapping field of views.

5. The method of claim 1 each of said electro-optical sensors within said grid comprises an indium antimonide (InSb) detector operating in a medium IR band.

6. The method of claim 5 wherein said indium antimonide (InSb) detector is a cryogenically cooled detector.

7. The method of claim 1 wherein said sensor video is processed frame by frame by each of said digital computers locally since there are network bandwidth limitations for said grid.

8. The method of claim 1 wherein a Kalman filter generates said velocity vector which discriminates said missile trajectory from said infrared emissions in proximity to said missile.

9. The method of claim 1 wherein said grid comprises twelve electro-optical sensors spaced apart by approximately twenty kilometers to provide missile threat detection capability over a distance of approximately one hundred kilometers, six of said twelve electro-optical sensors being positioned approximately parallel to said flight path on one side of said flight path and six of said twelve electro-optical sensors being positioned approximately parallel to said flight path on the other side of said flight path.

10. The method of claim 1 wherein each of said digital computers within said grid includes a video monitor connected to said digital computer and an antenna connected to said digital computer, said antenna providing for communications within said grid including the step of broadcasting said sight line data over said grid.

11. The method of claim 1 wherein each of said plurality of digital computers comprises a personal computer having a windows operating system.

12. A method for protecting aircraft from being attacked by a missile which is launched in proximity to a flight path at an airport comprising the steps of:
  (a) detecting the launch of said missile which is targeted at said aircraft traveling along the flight path at said airport;
  (b) monitoring said missile as said missile travels towards a targeted aircraft on an intercept path with said targeted aircraft;
  (c) generating sensor video of the launch and flight of said missile as said missile travels towards the targeted aircraft on said intercept path, wherein a plurality of electro-optical sensors forming a grid are positioned in proximity to said flight path to generate said sensor video;
  (d) processing said sensor video utilizing a plurality of digital computers, one of said digital computers being associated with and connected to one of said plurality electro-optical sensors to receive and process said sensor video generated by said electro-optical sensor;
  (e) comparing pixels within said sensor video to determine which of said pixels exceed an intensity threshold and then finding a centroid for groups of adjacent pixels which exceed said intensity threshold, said centroid for each of said groups of adjacent pixels being representative of current position coordinates for said missile on said intercept path;
  (f) generating sight line data for each of said plurality of electro-optical sensors, said sight line data being generated by processing said centroid for each of said groups of adjacent pixels, said sign line data generated for each of said plurality of electro-optical sensors representing sight lines between said missile and each of said plurality of electro-optical sensors as said missile travels along said intercept path;
  (g) broadcasting said sight line data over said grid to each of said digital computers within said grid;
  (h) processing said sight line data to determine when one of said sight lines intersects with another of said sight lines for a pair of electro-optical sensors having overlapping field of views wherein said digital computers within said grid process said sight line data to find each intersection of sight lines of said electro-optical sensors having overlapping field of views;
  (i) generating three dimensional X,Y,Z coordinates of a point along the intercept path of said missile whenever one of said sight lines intersects with another of said sight lines for said pair of electro-optical sensors having overlapping field of views and an observation time for said three dimensional x,y,z coordinates wherein each of said digital computers within said grid generate said three dimensional X,Y,Z coordinates;
  (j) transmitting said three dimensional X,Y,Z coordinates generated by each of said digital computers within said grid to a central processor;
  (k) correlating said three dimensional X,Y,Z coordinates generated by each of said digital computers within said grid to generate a velocity vector which discriminates missile trajectory from infrared emissions in proximity to said missile;
  (l) identifying which of said aircraft on the flight path at said airport are target aircraft of said missile; and
  (m) sending a dispense countermeasure signal to said target aircraft, wherein said target aircraft upon receiving said dispense countermeasure signal releases a countermeasure comprising an infrared flare to deceive said missile and re-route said missile from said flight path.

13. The method of claim 12 wherein approximately one half of said electro-optical sensors within said grid are positioned on one side of said flight path equidistant from one another, and the other half of said electro-optical sensors within said grid are positioned on the opposite side of said flight path equidistant from one another, wherein said electro-optical sensors adjacent to one another have said overlapping field of views.

14. The method of claim 13 each of said electro-optical sensors within said grid comprises an indium antimonide (InSb) detector operating in a medium IR band.

15. The method of claim 14 wherein said indium antimonide (InSb) detector is a cryogenically cooled detector.

16. The method of claim 12 wherein said sensor video is processed frame by frame by each of said digital computers locally since there are network bandwidth limitations for said grid.

17. The method of claim 12 wherein a Kalman filter generates said velocity vector which discriminates said missile trajectory from said infrared emissions in proximity to said missile.

18. The method of claim 12 wherein said grid comprises twelve electro-optical sensors spaced apart by approximately twenty kilometers to provide missile threat detection capability over a distance of approximately one hundred kilometers, six of said twelve electro-optical sensors being positioned approximately parallel to said flight path on one side of said flight path and six of said twelve electro-optical sensors being positioned approximately parallel to said flight path on the other side of said flight path.

19. The method of claim 12 wherein each of said digital computers within said grid includes a video monitor connected to said digital computer and an antenna connected to said digital computer, said antenna providing for communications within said grid including the step of broadcasting said sight line data over said grid.

20. A method for protecting aircraft from being attacked by a missile which is launched in proximity to a flight path at an airport comprising the steps of:
  (a) detecting the launch of said missile which is targeted at said aircraft traveling along the flight path at said airport;
  (b) monitoring said missile as said missile travels towards a targeted aircraft on an intercept path with said targeted aircraft;
  (c) generating sensor video of the launch and flight of said missile as said missile travels towards the targeted aircraft on said intercept path, wherein a plurality of electro-optical sensors forming a grid are positioned in proximity to said flight path to generate said sensor video, one half of said electro-optical sensors within said grid are positioned on one side of said flight path equidistant from one another, and the other half of said electro-optical sensors within said grid are positioned on the opposite side of said flight path equidistant from one another, said electro-optical sensors adjacent to one another having said overlapping field of views;
  (d) processing said sensor video utilizing a plurality of digital computers, one of said digital computers being associated with and connected to one of said plurality electro-optical sensors to receive and process said sensor video generated by said electro-optical sensor;

(e) comparing pixels within said sensor video to determine which of said pixels exceed an intensity threshold and then finding a centroid for groups of adjacent pixels which exceed said intensity threshold, said centroid for each of said groups of adjacent pixels being representative of current position coordinates for said missile on said intercept path;

(f) generating sight line data for each of said plurality of electro-optical sensors, said sight line data being generated by processing said centroid for each of said groups of adjacent pixels, said sign line data generated for each of said plurality of electro-optical sensors representing sight lines between said missile and each of said plurality of electro-optical sensors as said missile travels along said intercept path;

(g) broadcasting said sight line data over said grid to each of said digital computers within said grid;

(h) processing said sight line data to determine when one of said sight lines intersects with another of said sight lines for a pair of electro-optical sensors having overlapping field of views wherein said digital computers within said grid process said sight line data to find each intersection of sight lines of said electro-optical sensors having overlapping field of views;

(i) generating three dimensional X,Y,Z coordinates of a point along the intercept path of said missile whenever one of said sight lines intersects with another of said sight lines for said pair of electro-optical sensors having overlapping field of views and an observation time for said three dimensional x,y,z coordinates wherein each of said digital computers within said grid generate said three dimensional X,Y,Z coordinates;

(j) transmitting said three dimensional X,Y,Z coordinates generated by each of said digital computers within said grid to a central processor;

(k) correlating said three dimensional X,Y,Z coordinates generated by each of said digital computers within said grid to generate a velocity vector which discriminates missile trajectory from infrared emissions in proximity to said missile, wherein a Kalman filter generates said velocity vector which discriminates said missile trajectory from said infrared emissions in proximity to said missile;

(l) identifying which of said aircraft on the flight path at said airport are target aircraft of said missile; and (m) sending a dispense countermeasure signal to said target aircraft, wherein said target aircraft upon receiving said dispense countermeasure signal releases a countermeasure comprising an infrared flare to deceive said missile and re-route said missile from said flight path.

* * * * *